(12) United States Patent
Rao et al.

(10) Patent No.: US 11,019,154 B2
(45) Date of Patent: May 25, 2021

(54) METHODS AND APPARATUSES FOR CORRELATING INTERCEPT RELATED INFORMATION WITH CALL CONTENT

(71) Applicant: NOKIA SOLUTIONS AND NETWORKS OY, Espoo (FI)

(72) Inventors: Nagaraja Rao, Boca Raton, FL (US); Curt Wong, Bellevue, WA (US); Derek Underwood, Amherst, NH (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/317,139

(22) PCT Filed: Jul. 11, 2017

(86) PCT No.: PCT/US2017/041494
§ 371 (c)(1),
(2) Date: Jan. 11, 2019

(87) PCT Pub. No.: WO2018/013537
PCT Pub. Date: Jan. 18, 2018

(65) Prior Publication Data
US 2019/0289080 A1    Sep. 19, 2019

Related U.S. Application Data

(60) Provisional application No. 62/360,630, filed on Jul. 11, 2016.

(51) Int. Cl.
*H04L 29/00* (2006.01)
*H04M 3/22* (2006.01)
(Continued)

(52) U.S. Cl.
CPC .......... *H04L 67/146* (2013.01); *H04L 43/028* (2013.01); *H04L 63/306* (2013.01); *H04L 67/141* (2013.01); *H04L 69/22* (2013.01)

(58) Field of Classification Search
CPC ... H04L 67/146; H04L 43/028; H04L 63/306; H04L 67/141; H04L 69/22
See application file for complete search history.

(56) References Cited

U.S. PATENT DOCUMENTS

2008/0162634 A1    7/2008  Johns
2009/0182668 A1*   7/2009  Lee ................. H04L 63/306
                                                    705/50
(Continued)

FOREIGN PATENT DOCUMENTS

CN         101731015 A      6/2010
WO       2010000310 A1      1/2010
(Continued)

OTHER PUBLICATIONS

"3rd Generation Partnership Project; Technical Specification Group Services and Systems Aspects; Study on Providing for LI in the S8 Home Routing Architecture for VoLTE (Release 14)", 3GPP Standard; 3GPP TR 33.827, 3rd Generation Partnership Project (3GPP), Mobile Competence Centre; 650, Route Des Lucioles; F-06921 Sophia-Antipolis Cedex; France, vol. SA WG3, No. V0.1.0, May 7, 2016.

(Continued)

*Primary Examiner* — Christopher B Robinson
(74) *Attorney, Agent, or Firm* — Squire Patton Boggs (US) LLP

(57) ABSTRACT

Systems, methods, and apparatuses for correlating intercept related information (IRI) with call content (CC) for S8HR lawful interception are provided. The method may include generating at a network entity a correlation identifier. The method may also include adding the correlation identifier to a session initiation protocol message. In addition, the method may include delivering the session initiation proto- (Continued)

col message including the correlation identifier from the network entity to another network entity.

20 Claims, 19 Drawing Sheets

(51) Int. Cl.
    *H04L 29/02*     (2006.01)
    *H04L 29/06*     (2006.01)
    *H04L 29/08*     (2006.01)
    *H04L 12/26*     (2006.01)

(56) References Cited

U.S. PATENT DOCUMENTS

| | | |
|---|---|---|
| 2009/0234845 A1* | 9/2009 | DeSantis .......... H04L 63/10 |
| 2010/0039946 A1* | 2/2010 | Imbimbo .......... H04L 67/14 |
| | | 370/252 |
| 2011/0103310 A1 | 5/2011 | Stojanovski et al. |
| 2011/0185049 A1* | 7/2011 | Atreya .......... H04W 8/082 |
| | | 709/222 |
| 2012/0163329 A1* | 6/2012 | Chen .......... H04W 8/12 |
| | | 370/329 |
| 2014/0059240 A1* | 2/2014 | Jansson .......... H04L 27/2601 |
| | | 709/228 |
| 2017/0156043 A1* | 6/2017 | Li .......... H04W 76/10 |
| 2018/0191786 A1* | 7/2018 | Kunz .......... H04L 65/1073 |

FOREIGN PATENT DOCUMENTS

| | | |
|---|---|---|
| WO | WO 2010/000310 A1 | 1/2010 |
| WO | WO 2015/116229 A1 | 8/2015 |
| WO | WO 2016/005007 A1 | 1/2016 |

OTHER PUBLICATIONS

Dec. 4, 2019 Extended Search Report issued in European Patent Application No. 17828283.6.
International Search Report & Written Opinion dated Sep. 21, 2017 corresponding to International Patent Application No. PCT/US2017/041494.
Chinese Office Action dated Dec. 11, 2020 corresponding to Chinese Patent Application No. 201780053934.3, with concise statement of relevance/partial translation.
3GPP TR 33.827 V0.1.0 (May 2016), Technical Report, 3rd Generation Partnership Project; Technical Specification Group Services and Systems Aspects; Study on Providing for LI in the S8 Home Routing Architecture for VoLTE Release 14), May 2016.

* cited by examiner

METHODS AND APPARATUSES FOR CORRELATING INTERCEPT RELATED INFORMATION WITH CALL CONTENT

CROSS REFERENCE TO RELATED APPLICATION

This application claims priority to U.S. Provisional Application No. 62/360,630 filed on Jul. 11, 2016. The entire content of the above-referenced provisional application is hereby incorporated by reference.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), voice over LTE (VoLTE), and/or 5G radio access technology. Some embodiments may generally relate to lawful interception (LI) in such networks.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or a plurality of eNBs. Multiple eNBs are involved for a single UE connection, for example, in case of Coordinated Multipoint Transmission (CoMP) and in dual connectivity.

LTE or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier, and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support within the same platform, an improved end-user experience, and a simple architecture resulting in low operating costs.

Certain releases of Third Generation Partnership Project (3GPP) LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A). LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

3GPP $5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability by up to hundreds of thousands of connections. The signal technology of 5G is anticipated to be improved for greater coverage as well as spectral and signaling efficiency.

Internet Protocol Multimedia Subsystem (IMS) is an architectural framework for delivering internet protocol (IP) multimedia services to UEs. Groupe Speciale Mobile Association (GSMA) Working Groups (e.g., RILTE, PACKET and SIGNAL) have recently agreed to support a new Inter-IMS operator roaming model called S8 Home Routing (S8HR) Architecture for voice over LTE (VoLTE). S8HR is a new roaming model where both the proxy call service control function (P-CSCF) and the packet gateway (P-GW) are located in the home public land mobile network (HPLMN) of the user, and Local Break Out (LBO) for media is not used when the user is roaming outside HPLMN.

SUMMARY

According to certain embodiments, an apparatus may include at least one memory including computer program code, and at least one processor. The at least one memory and the computer program code may be configured, with the at least one processor, to cause the apparatus at least to generate at a network entity a correlation identifier. The at least one memory and the computer program code may also be configured, with the at least one processor, to cause the apparatus at least to add the correlation identifier to a session initiation protocol message at the network entity. In addition, the at least one memory and the computer program code may be configured, with the at least one processor, to cause the apparatus at least to deliver the session initiation protocol message including the correlation identifier from the network entity to another network entity.

A method, in certain embodiments, may include generating at a network entity a correlation identifier. The method may also include adding the correlation identifier to a session initiation protocol message at the network entity. In addition, the method may also include delivering the session initiation protocol message including the correlation identifier from the network entity to another network entity.

An apparatus, in certain embodiments, may include means for generating at a network entity a correlation identifier. The apparatus may also include means for adding the correlation identifier to a session initiation protocol message at the network entity. In addition, the apparatus may include means for delivering the session initiation protocol message including the correlation identifier from the network entity to another network entity.

According to certain embodiments, a non-transitory computer-readable medium encoding instructions that, when executed in hardware, perform a process. The process may include generating at a network entity a correlation identifier. The process may also include adding the correlation identifier to a session initiation protocol message at the network entity. In addition, the process may include delivering the session initiation protocol message including the correlation identifier from the network entity to another network entity.

According to certain other embodiments, a computer program product may encode instructions for performing a process. The process may include generating at a network entity a correlation identifier. The process may also include adding the correlation identifier to a session initiation protocol message at the network entity. In addition, the process may include delivering the session initiation protocol message including the correlation identifier from the network entity to another network entity.

According to certain embodiments, an apparatus may include at least one memory including computer program code, and at least one processor. The at least one memory and the computer program code may be configured, with the at least one processor, to cause the apparatus at least to receive at a network entity a session initiation protocol message including a correlation identifier from another network entity. The at least one memory and the computer program code may also be configured, with the at least one processor, to cause the apparatus at least to transmit media packets associated with an internet protocol multimedia subsystem signaling bearer established using the correlation identifier from the network entity to the another network entity. The media packets may be related to intercept related information.

A method, in certain embodiments, may include receiving at a network entity a session initiation protocol message including a correlation identifier from another network entity. The method may also transmitting media packets associated with an internet protocol multimedia subsystem signaling bearer established using the correlation identifier from the network entity to the another network entity. The media packets may be related to intercept related information.

An apparatus, in certain embodiments, may include means for receiving at a network entity a session initiation protocol message including a correlation identifier from another network entity. The apparatus may also include means for transmitting media packets associated with an internet protocol multimedia subsystem signaling bearer established using the correlation identifier from the network entity to the another network entity. The media packets may be related to intercept related information.

According to certain embodiments, a non-transitory computer-readable medium encoding instructions that, when executed in hardware, perform a process. The process may include receiving at a network entity a session initiation protocol message including a correlation identifier from another network entity. The process may also include transmitting media packets associated with an internet protocol multimedia subsystem signaling bearer established using the correlation identifier from the network entity to the another network entity. The media packets may be related to intercept related information.

According to certain other embodiments, a computer program product may encode instructions for performing a process. The process may include receiving at a network entity a session initiation protocol message including a correlation identifier from another network entity. The process may also include transmitting media packets associated with an internet protocol multimedia subsystem signaling bearer established using the correlation identifier from the network entity to the another network entity. The media packets may be related to intercept related information.

BRIEF DESCRIPTION OF THE DRAWINGS

For proper understanding of the invention, reference should be made to the accompanying drawings, wherein.

DETAILED DESCRIPTION

Figure 1:
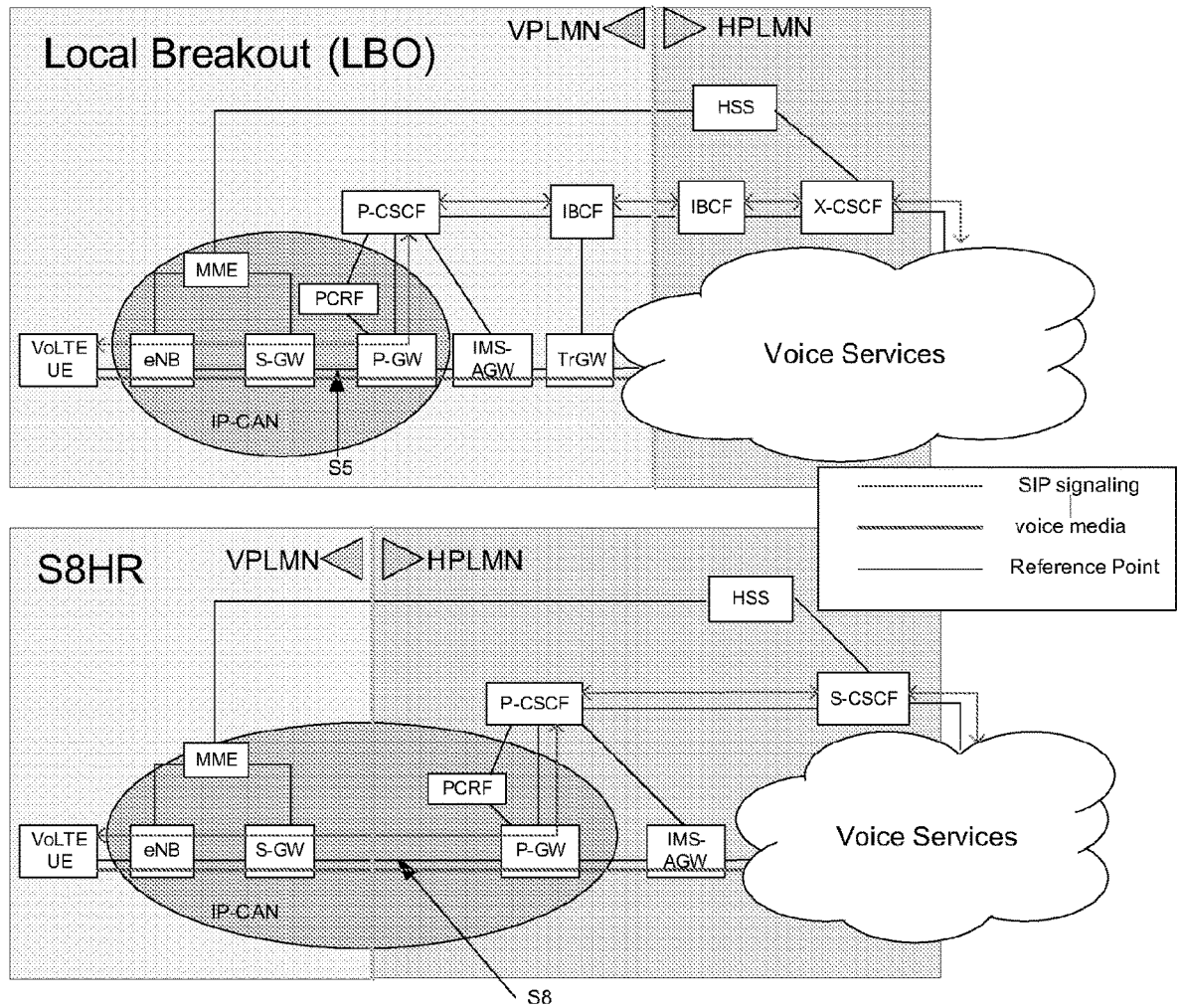
FIG. 1 illustrates a block diagram depicting two VoLTE roaming approaches of LBO and S8HR, according to an embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for correlating intercept related information with the call content, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments of the invention relate to Lawful Interception (LI) of inbound roamer's voice services in the visited network, for example, when S8HR based approach is used as the VoLTE roaming architecture. LI refers to a legally authorized process of intercepting the communication of private individuals. VoLTE roaming means that a VoLTE subscriber of an operator (referred to as Home Operator or HPLMN) is accessing the voice related services while roaming in another operator's network (referred to as Visited Operator VPLMN).

Two approaches are defined for VoLTE roaming: Local Breakout (LBO) and S8 based Home Routing (S8HR). In the LBO case, the Packet Data Network (PDN) connectivity is done within the Visited Operator's Network (i.e., VPLMN) and some IMS network nodes of VPLMN are used in the handling of calls.

In the case of S8HR, the PDN connectivity is established to the Home Network (i.e., HPLMN) and IMS nodes involved in handling the call reside only in the HPLMN. Therefore, S8HR is a roaming model where both the P-CSCF and the P-GW are located in the HPLMN of the user and LBO is not used when the user is roaming outside HPLMN. The S8HR architecture includes the following technical characteristics: (1) bearers for IMS services are established on the S8 reference point; (2) all IMS nodes are located in the HPLMN, and all session initiation protocol (SIP) signalling and media traffic for the VoLTE roaming service are routed through HPLMN; (3) IMS transactions are performed directly between the terminal and P-CSCF at the HPLMN.

FIG. 1 illustrates a block diagram depicting the two VoLTE roaming approaches—LBO and S8HR. In the example of FIG. 1, a cloud with "Voice Services" is shown to infer that the other end of the call can be reached in variety of ways: within the HPLMN, in the VPLMN, in another IMS-based network or in a public switched telephone network (PSTN), etc. As shown in FIG. 1, the P-GW (also referred to as PDN-GW) and the P-CSCF reside in the VPLMN for the LBO case, whereas the P-GW and the P-CSCF reside in the HPLMN for the S8HR case. Some embodiments of the invention relate to the lawful interception functions to be provided for voice services within the VPLMN.

It is noted that the rules that govern lawful interception are strongly regulated by national laws and telecommunications acts in each country/region. All Law Enforcement Agencies (LEAs) demand that the ability to perform the lawful interception of voice services is a must even for inbound roamers (in the VPLMN) independent of which roaming approach is used.

The 3GPP technical specifications (TS) 33.107 and TS 33.108 define LI configuration, internal and external LI interfaces for 3GPP network architectures and 3GPP defined services. 3GPP TS 33.106, TS 33.107, and TS 33.108 are hereby incorporated by reference in their entirety. Standards in North America define the external LI interface to networks deployed in North America. The LI functions to perform the lawful interception in the VPLMN when the LBO approach is used as the roaming architecture is already defined in those standards.

3GPP TS 33.106 defines the stage 1 requirements of lawful interception for 3GPP based systems, 3GPP TS 33.107 defines the stage 2 requirements for lawful interception for 3GPP based systems, and 3GPP TS 33.108 defines the stage 3 requirements for lawful interception for 3GPP based systems.

Figure 2:
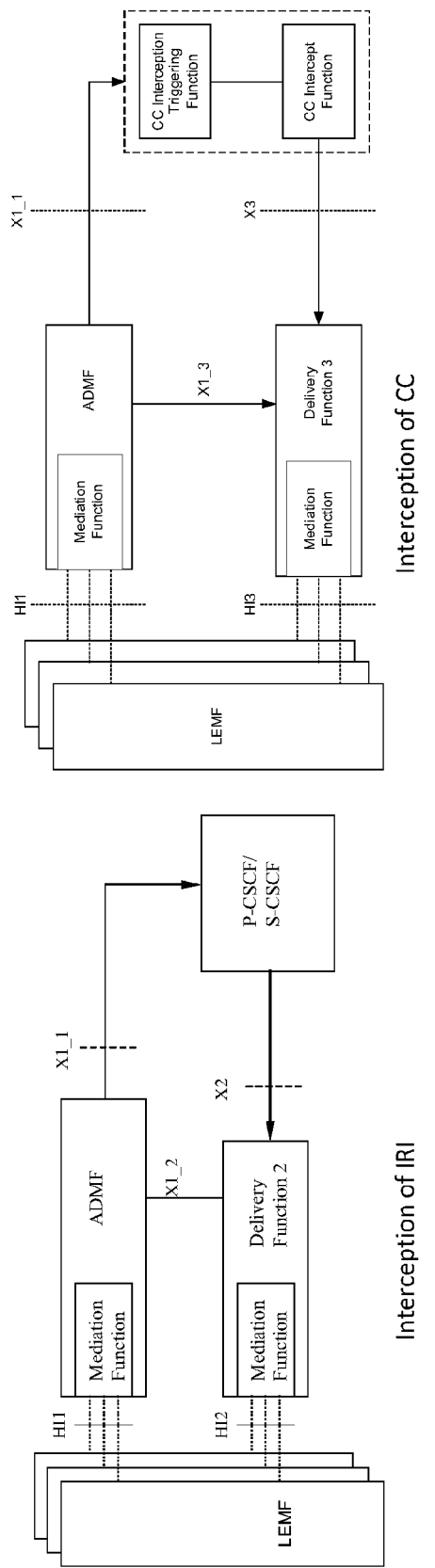
FIG. 2 illustrates an overview of LI architecture for VoIP, according to an embodiment.

FIG. 2 illustrates an overview of LI architecture for VoIP (applicable to VoIP interception in HPLMN (roaming/non-roaming) and VPLMN with LBO). FIG. 2 depicts the VoIP LI architecture as defined in 3GPP TS 33.107. 3GPP TS 33.107 defines which network nodes provide the call content (CC) Intercept Triggering Function and which network nodes provide the Intercept Related Information (IRI) Function. In the case of LBO, the interception of IRI is done in the VPLMN at the P-CSCF, and the interception of CC is done in the VPLMN at the P-GW or IMS-AGW depending on the deployment scenario.

Figure 3:
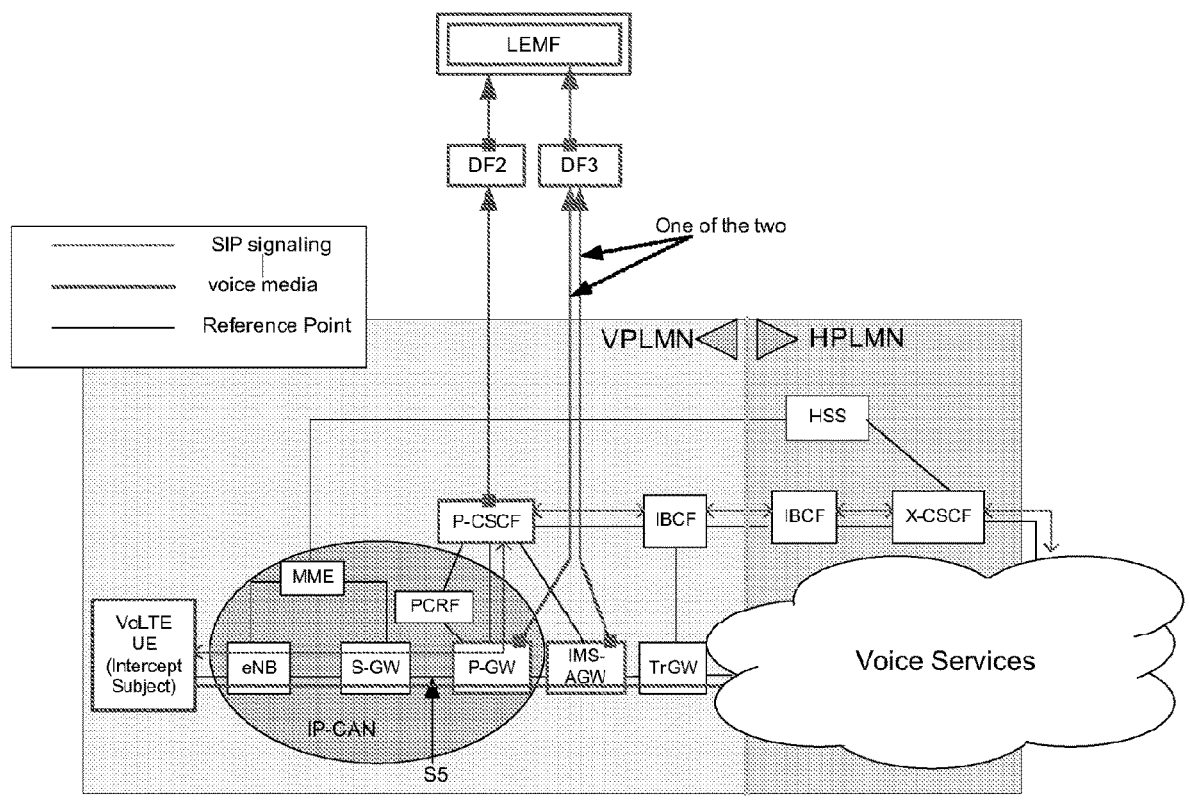
FIG. 3 illustrates an overview of the network topology depicting the lawful interception of voice services in the VPLMN for the LBO case, according to an embodiment.

FIG. 3 illustrates an overview of the network topology that depicts the lawful interception of voice services in the VPLMN for the LBO case. The trigger to perform the CC interception (at P-GW or IMS-AGW) is sent by the P-CSCF during the call establishment phase. The IRI and CC delivered to the law enforcement agencies (LEAs) must be correlated so as to allow the LEAs to associate the CC with the IRI. This correlation number is transferred from the P-CSCF to P-GW or IMS-AGW as a part of call setup.

The stage 2 definitions specified in 3GPP TS 33.107 includes the architectural concepts for performing lawful interception for various 3GPP defined services to which lawful interception applies. A general architectural concept as applicable to VoIP calls is illustrated in FIG. 2 outlined above. The HI2 reference point is used to deliver the IRI messages to a law enforcement monitoring facility (LEMF) as per 3GPP TS 33.108. HI3 reference point is used to deliver the CC to the LEMF as per 3GPP TS 33.108. HU reference point is used to allow the LEMF to submit the LI service request to the operator serving the Intercept Subject. However, the details of the HU reference point are not standardized. The X1_1, X1_2, X1_3, X2 and X3 reference points used as part of the PLMN transfer of the LI related data. The details of these are also not standardized.

3GPP TS 33.107 and 3GPP TS 33.108 define the methods used to establish a correlation between IRI and the CC for VoIP sessions of scenarios other than the S8HR. As shown in FIG. 2, when an IMS-based VoIP call is established, the CC Intercept Triggering Function sends a CC Interception Trigger to the CC Intercept Function. The CC Intercept Function is a network node present on the media path of the call providing CC interception.

3GPP TS 33.107 states that the CC Intercept Trigger at the minimum shall contain: Media Identifier and Correlation Identifier. The Media Identifier identifies the media and the Correlation Identifier identifies the Correlation Number to be used for the corresponding media. The CC Intercept Function includes the Correlation Identifier within the CC delivered to the LEMF through interface DF3, as shown in FIG. 3. Since the CC Intercept Trigger is sent on a per IMS voice session basis, this method may allow a CC to be correlated with the IRI of the associated IMS session.

With the S8HR based approach, none of the network nodes mentioned above (i.e., P-GW, IMS-AGW, or P-CSCF) reside in the VPLMN (see FIG. 1). As a result, the capabilities defined in the current (3GPP) standards/specifications are not able to provide the LI functions in the VPLMN for the S8HR based approach. In other words, a new solution for LI is required for the S8HR roaming model.

Figure 4:
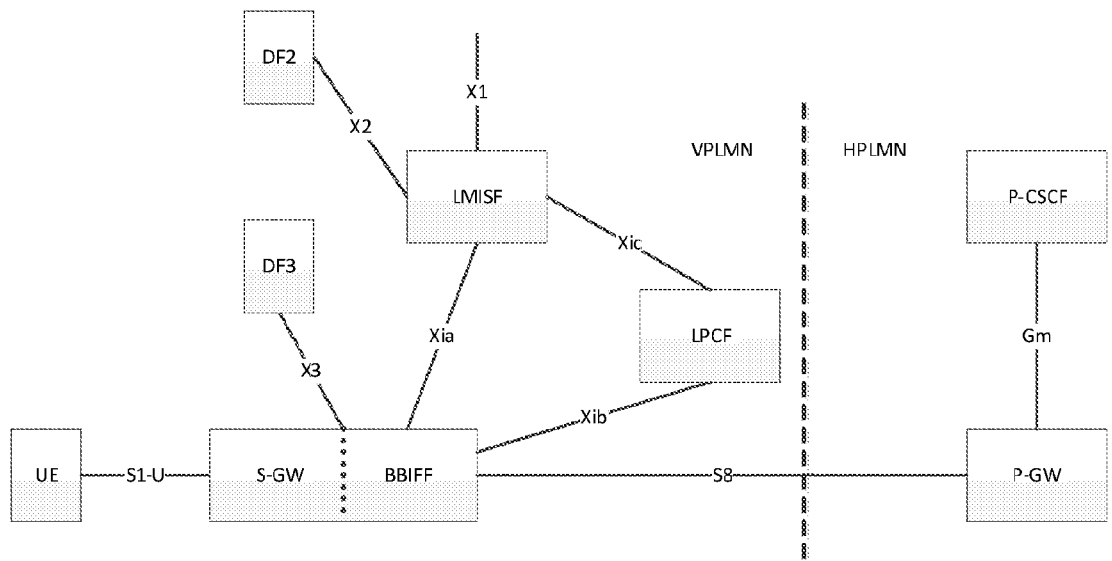
FIG. 4 illustrates an example functional LI architecture, according to an embodiment.

FIG. 4 illustrates an example functional LI architecture (3GPP TR 33.827) that is under study within the 3GPP-SA3-LI standards group as a solution to provide the lawful interception of inbound roamer's voice services in the VPLMN for the S8HR case. A functional entity within the S-GW referred to as Bearer Binding Intercept and Forwarding Function (BBIFF) forwards all the IMS Signalling packets related to S8HR to another functional entity referred to as LI Mirror IMS State Function (LMISF), which in turn examines each SIP message to determine if the related VoIP call needs to be intercepted. If the call does need to be intercepted, then the LMISF delivers the SIP messages of that call to DF2, which in turn would deliver the IRI to LEMF. The LMISF may directly inform the BBIFF or indirectly inform the BBIFF via another network entity to deliver the media packets of the call associated with the IMS session to DF3, which in turn may deliver the CC to the LEMF.

In some other embodiments, the LMISF may inform another functional entity, such as a LI Policy Control Function (LPCF) or any other network entity, about the IMS session that is being intercepted. In embodiment involving the LPCF, the LMISF may communicate with the LPCF via interface Xic, and the LPCF may communication with the BBIFF via interface Xib. The LPCF or the any other network entity, including the LMISF, may then inform the BBIFF to deliver the Media packets of the call associated with that IMS session to DF3, which in turn would deliver the CC to the LEMF. Although an LPCF is shown in FIG. 4, certain other embodiments may not have an LPCF. In such embodiments, at least part of the functions of the LPCF may be absorbed by any other network entity, including the LMISF.

One of the criteria considered within the SA3 LI study is to make sure any new architecture/concept defined to provide the LI functions in the VPLMN when the S8HR based approach is used as the roaming architecture is comparable to the similar functions provided when the LBO approach is used as the roaming architecture. 3GPP TR 33.827 identifies quite a few open issues and one such issue is to develop an approach to allow the correlation of IRI and CC. Certain embodiments of the invention address the problem of this correlation issue and provide appropriate solutions.

As discussed in the foregoing, when a S8HR based approach is used as the VoLTE roaming architecture, none of the network nodes that are involved in performing the lawful interception of voice services reside in the VPLMN. The S-GW and MME that reside in the VPLMN (see FIG. 1) do provide the LI functions for packet data but not for the voice services. An Intercept Subject of packet data interception may be identified with use of at least one of an International Mobile Station Equipment Identity (IMEI), an international mobile subscriber identity (IMSI), or a Mobile Station International Subscriber Directory Number (MSISDN). However, an Intercept Subject of IMS voice service may be identified with a SIP uniform resource identifier (URI) or telephone (TEL) URI, even though the capabilities to identify the Intercept Subject based on IMEI was added recently.

The SIP URI or TEL URI used to identify the Intercept Subject may only be available within the SIP messages. Therefore, in order to provide the LI functions for voice services, the SIP messages have to be looked into to determine whether a particular IMS session being established involves the Intercept Subject.

Figure 5:
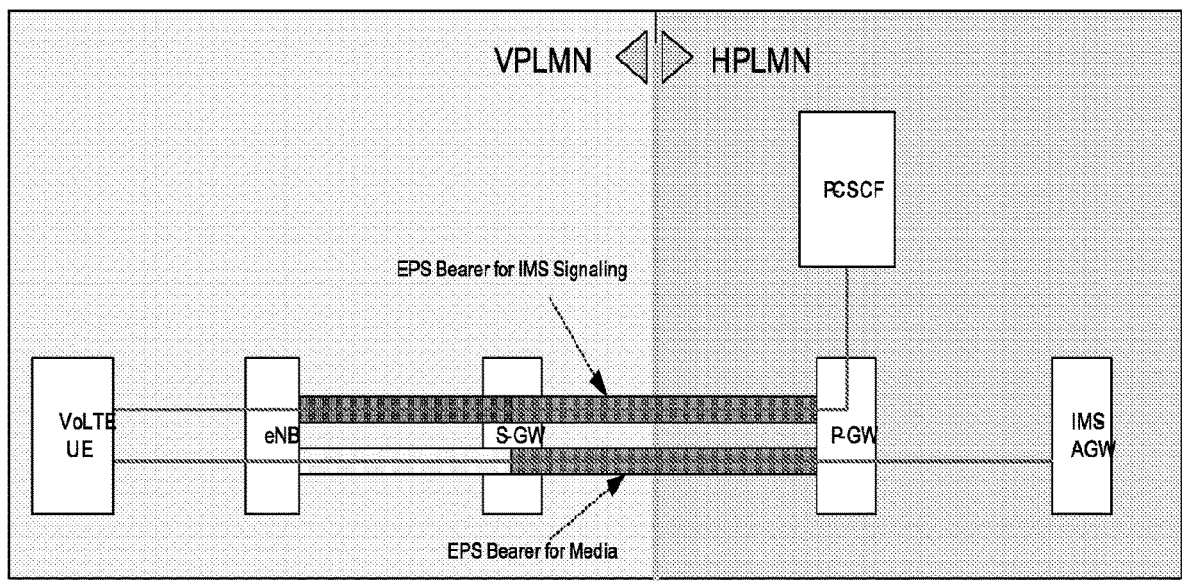
FIG. 5 illustrates a block diagram depicting the IMS Bearer and Media Bearer, according to an embodiment.

Within the evolved packet core (EPC) network, the IMS Signalling packets flow through the IMS Signalling Bearer and Media packets flow through the Media Bearer. FIG. 5 illustrates a block diagram depicting the IMS Signaling Bearer and Media Bearer. As can be seen from FIG. 5, the SIP Signalling messages and voice media pass through the network nodes residing in the EPC of VPLMN rather transparently. The network that wants to do the interception has to look into all the IMS packets to figure out whether a SIP message involves an Intercept Subject.

One approach is to do a deep packet interception of IMS Signalling packets and the Media packets to detect whether those packets relate to an Intercept Subject, and if so, deliver those packets to the LEAs using the same protocol defined in the LI standards (e.g., 3GPP TS 33.108). The SIP messages that correspond to an Intercept Subject can be delivered to the LEA as IRI messages and the Media packets from the Media Bearer established for the associated IMS Signalling Bearer can be delivered to the LEA as CC messages.

Figure 6:
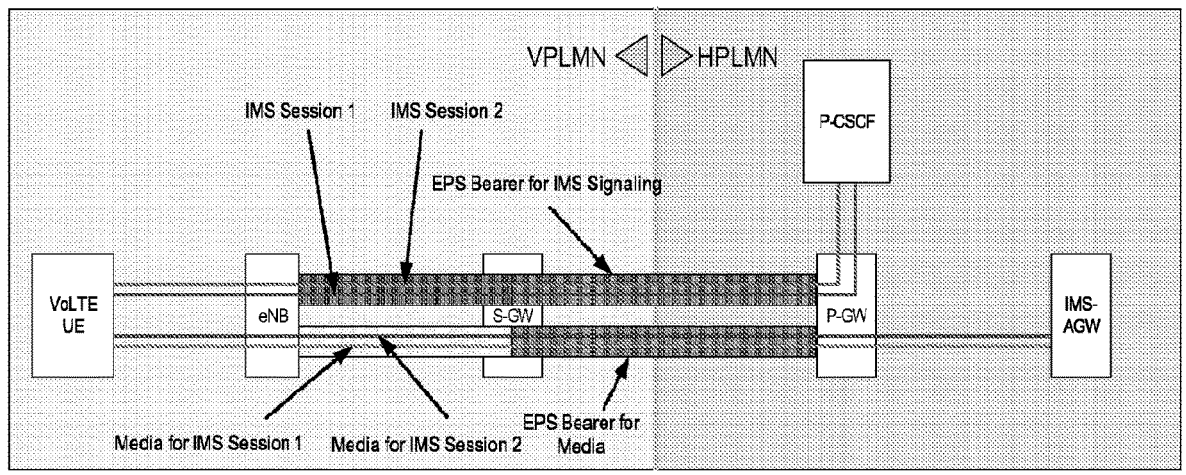
FIG. 6 illustrates a block diagram depicting an example of how multiple IMS sessions at a time are possible, according to an embodiment.

Since an Intercept Subject may be involved in more than one IMS session (e.g., hold, conferencing) at a given time, there can be multiple media streams present within the Media Bearer. FIG. 6 illustrates a block diagram depicting an example of how multiple IMS sessions at a time are possible. As illustrated in FIG. 5 and FIG. 6, IMS Signalling Bearer and Media Bearer are two separate bearers. In other words, packets for IMS Signalling and Media flow through two separate general packet radio service (GPRS) tunneling protocol (GTP) user plane (GTP-U) tunnels.

The network nodes within the VPLMN may be able to tell which Media Bearer is related to which IMS Signalling Bearer. However, knowing which Media packet is associated with which IMS session is not easy. And, as a consequence, the correlation between the IRI and CC of a particular IMS session can become a challenge. SA3 LI, within the study (3GPP TR 33.827), has identified this as an issue that requires further analysis and research. As mentioned above, certain embodiments of the invention provide a method to correlate the IRI and the CC of a particular IMS session.

It is noted that, within the EPC (S8HR approach), only an association of a Media Bearer to an IMS Signalling Bearer can be done (through the use of Linked Bearer Identity), but an association of media path within a Media Bearer to an IMS session requires an additional process as described herein.

Figure 7:
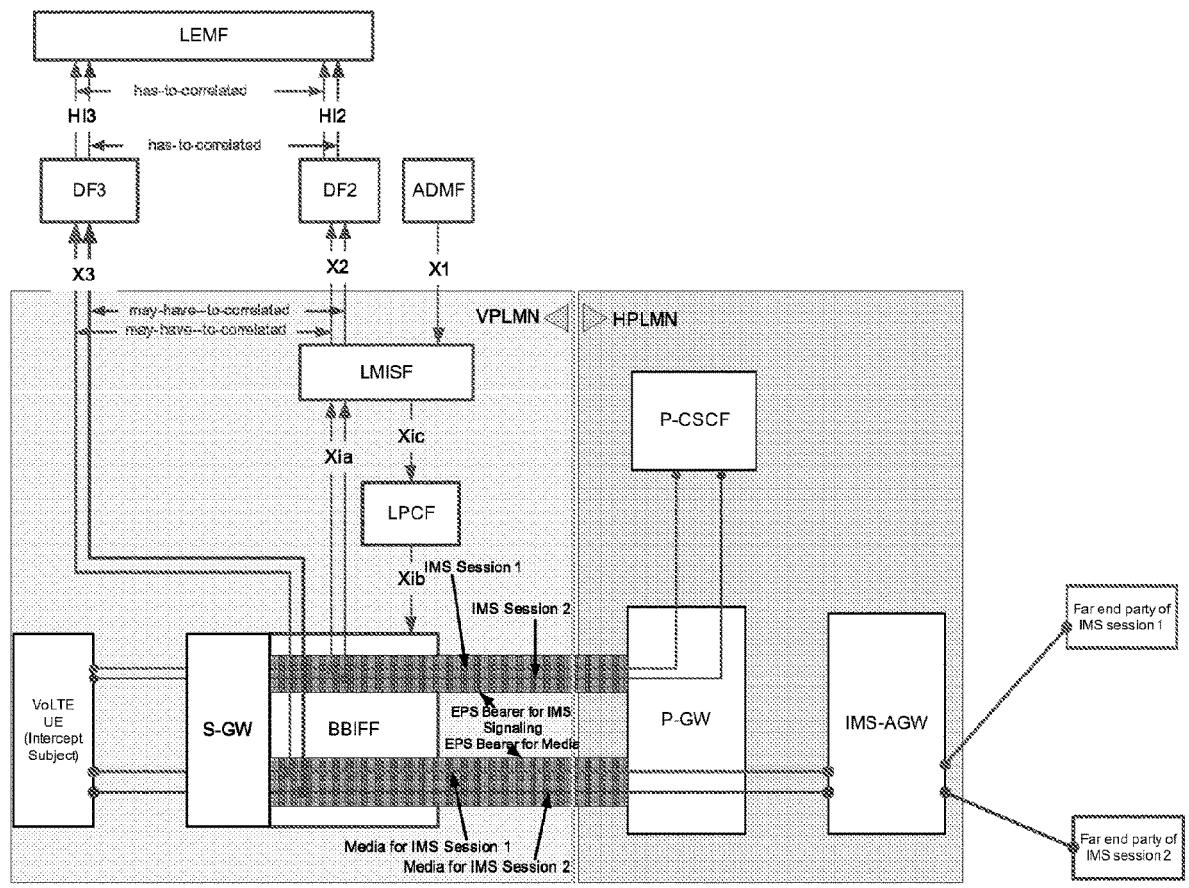
FIG. 7 illustrates the S8HR architecture where an Interception Subject is involved in two IMS sessions, according to an embodiment.

FIG. 7 illustrates the S8HR architecture as contemplated in SA3 LI where an Interception Subject is involved in two IMS sessions. As illustrated in FIG. 7, all IMS signalling packets related to S8HR are delivered (by BBIFF) to the LMISF. The LMISF examines the SIP messages, determines whether an Intercept Subject is involved and, if so, deliver the SIP messages toward the LEMF through the DF2. In certain embodiments, the LMISF may then notify the LPCF or any other network entity of the particulars of the IMS Signalling Bearer being intercepted. The LPCF or the any other network entity may notify the BBIFF to deliver the packets of the associated Media Bearer to the DF3. Even if the LMISF gives some sort of correlation information to LPCF or the any other network entity, and even if the LPCF or the any other network entity forwards it to the BBIFF, when multiple IMS sessions are involved, the BBIFF will not be able to associate a particular Media packet to a particular media session unless BBIFF itself performs a deep packet inspection. In some other embodiments, the LMISF may notify the BBIFF either directly or via another network entity.

The strategy of the architecture illustrated in FIG. 7 is not to have any deep packet inspection at the BBIFF since introduction of such a function may require examining every packet that flows through the S-GW. That is the reason all IMS Signalling packets are delivered to LMISF and the deep packet inspection of IMS Signalling packets is done at the LMISF.

Thus, according to certain embodiments, a method is provided to associate each Media packet flowing through an EPS Bearer for Media of an IMS session, to the corresponding SIP session where its packets are flowing through an EPS Bearer for IMS Signalling. And, according to some embodiments, this may be done only for those IMS sessions that involve the inbound roamers within the VPLMN, when S8HR approach is used as the roaming architecture.

Figure 8:
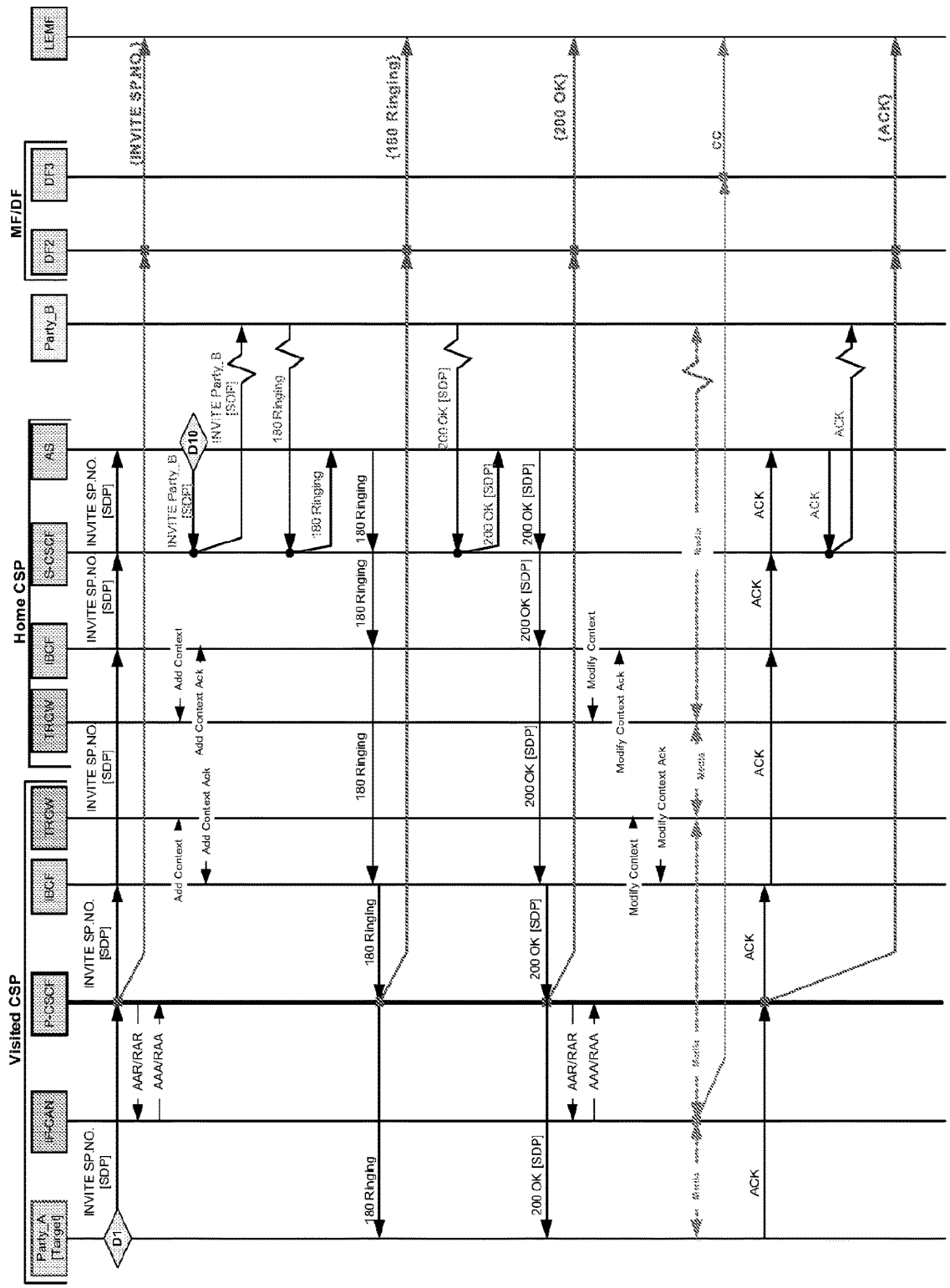
FIG. 8 illustrates an example signaling flow diagram in which the roaming target originates a call, according to an embodiment.

FIG. 8 illustrates an example signaling flow diagram in which the roaming target originates a call, with interception in the visited communication service provider (CSP) (e.g., 3GPP TS 33.107). In the call flow of FIG. 8, IP-CAN represents the IP-based Carrier Access Network and from the CC interception perspective can be a PDN-GW, GGSN, or an IMS-AGW. The AAR/RAR sent from P-CSCF to IP-CAN includes the information related to CC Intercept Trigger and hence, the Media Identifier and the Correlation ID. The Media Node within the IP-CAN that intercepts and delivers the CC to DF3 includes the Correlation Information within the CC.

3GPP TS 33.108 includes an IMS-VoIP related section on the Correlation Number, which provides that, for a given target, the Correlation Number is unique per VoIP session and used to correlate CC with IRI or correlate different IRI records and different CC data within one VoIP session. For IMS-based VoIP, the S-CSCF and optionally, the P-CSCF provide the IRI events. For IMS-based VoIP, the functional element that provides the CC interception depends on the call scenario and network configuration. As described in TS 33.107, CC interception is done by one of the following functional elements (referred to as CC Intercept Function): PDN-GW/GGSN, IMS-AGW, TrGW, IM-MGW, or MRF. The trigger to perform the CC interception at the above functional elements may be provided by the following functional elements (referred to as CC Interception Triggering Function): P-CSCF for PDN-GW/GGSN, P-CSCF for IMS-AGW, IBCF for TrGW, MGCF for IM-MGW, or S-CSCF or AS for MRF. For the delivery of CC, the CC Intercept Triggering Function provides the Correlation Number to the CC Intercept Function. This Correlation Number is delivered to the LEMF on the handover interface HI3 and is also delivered to the LEMF on the handover interface HI2. The IMS-VoIP-Correlation delivered to the LEMF on the HI2, contains the Correlation Number(s) used for the IRI messages as IMS-IRI (IRI-to-IRI-Correlation) and Correlation Number(s) used for the CC data as IMS-CC (IRI-to-CC-Correlation). The LEMF shall interpret that the IRI messages and the CC data containing those Correlation Number values belong to the one single IMS VoIP session. On the HI2 and HI3 (interfaces from the DF2 and DF3 to LEMF), the correlation information is delivered using the ASN.1 parameters introduced in section 12.1.4 of 3GPP TS 33.108.

However, the above-described concepts from the 3GPP specifications are not applicable for the interception of voice services in the VPLMN when an S8HR based approach is used as a roaming architecture.

Figure 9:
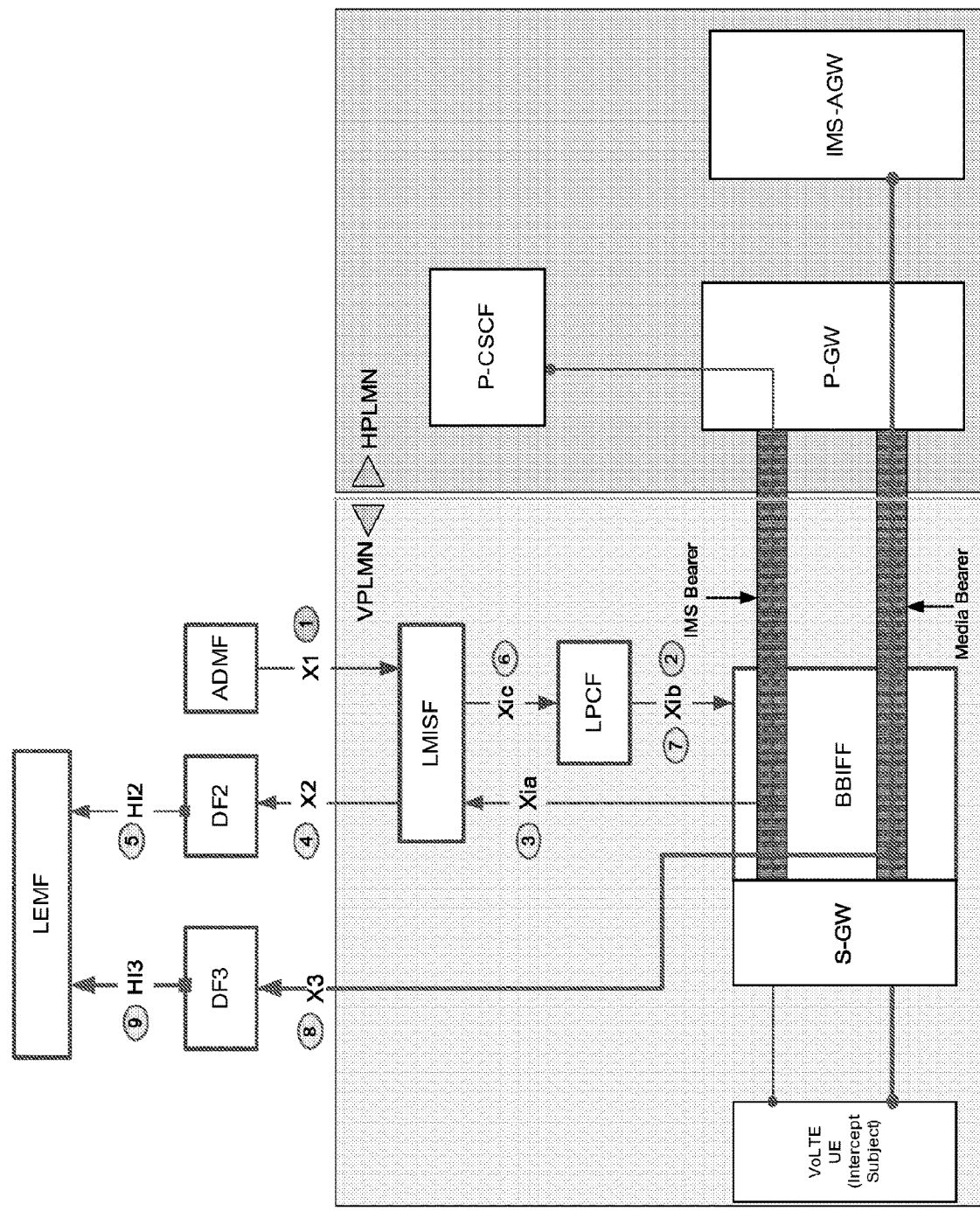
FIG. 9 illustrates an S8HR LI Architecture, according to an embodiment.

FIG. 9 illustrates an S8HR LI Architecture with reference number indicating the process steps as follows. As illustrated in FIG. 9, at step 1, LMISF is provisioned with Intercept Subject information (for Voice Services, it can be SIP URI, TEL URI or IMEI) from the ADMF. At step 2, LPCF instructs the BBIFF to deliver the packets of all IMS Signalling Bearers established for S8HR APNs (Access Point Names) to the LMISF. The LPCF may supply the S8HR APNs to the BBIFF. Although FIG. 9 illustrates that the LPCF instructs the BBIFF, in other embodiments any other network entity, including the LMISF, may directly instruct or indirectly instruct the BBIFF. Some embodiments may not even include the LPCF. At step 3, the BBIFF delivers the packets of those IMS Signalling Bearers to the LMISF. As such, BBIFF has no idea whether the packets of an IMS Signalling Bearer are related to an Intercept Subject or not. It simply delivers all packets.

Continuing with FIG. 9, at step 4, the LMISF performs a deep packet inspection and looks at the SIP messages and examines the SIP headers that carry the calling party identity and/or called party identity to verify whether any of those match with the Intercept Subject Identity stored locally. If the SIP message corresponds to an Intercept Subject, then LMISF delivers those packets to the DF2. At step 5, the DF2 will generate and deliver the IRI to the LEMF as per 3GPP TS 33.108. At step 6, the LMISF informs the LPCF or any other network entity about the identity of the IMS Signalling Bearer that is being intercepted. At step 7, the LPCF or any other network entity may instruct the BBIFF to deliver the packets of the Media Bearers linked to that IMS Signalling Bearer to DF3. Then, at step 8, BBIFF delivers the Media packets to the DF3. BBIFF knows that the Media packets are related to an IMS Signalling Bearer, but does not know which Media packet related to which IMS session in the event Intercept Subject is involved in multiple sessions. At step 9, DF3 generates and delivers the CC as per 3GPP TS 33.108 to the LEMF.

Figure 10:
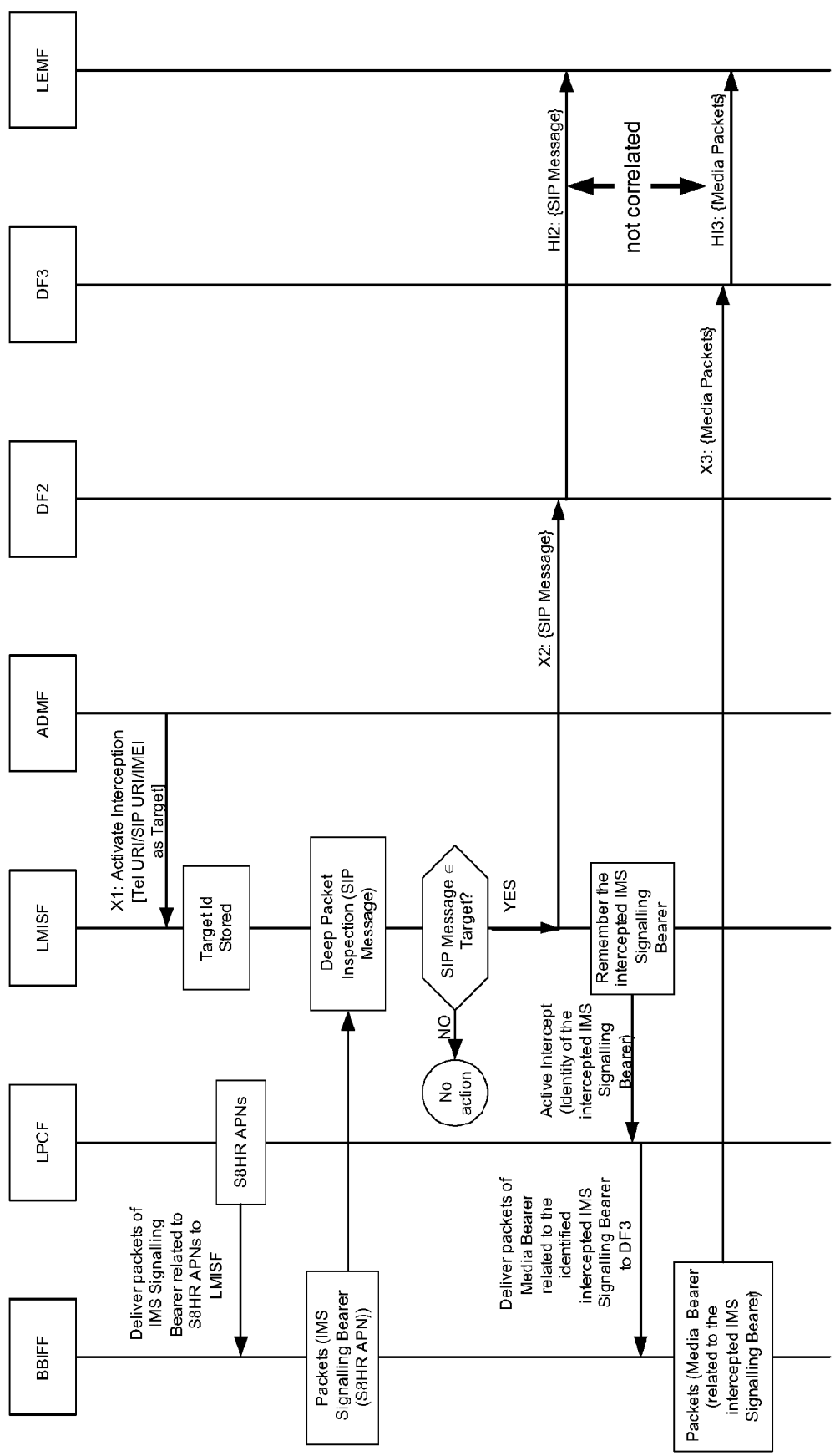
FIG. 10 illustrates a signaling flow diagram depicting a method, according to one embodiment.

FIG. 10 illustrates a signaling flow diagram showing the process steps outlined above and shown in FIG. 9. Although the embodiment shown in FIG. 10 includes the LPCF, in certain other embodiments the LPCF may not be present, and at least part of the functions of the LPCF may be absorbed by one or more other network entities.

Figure 11:
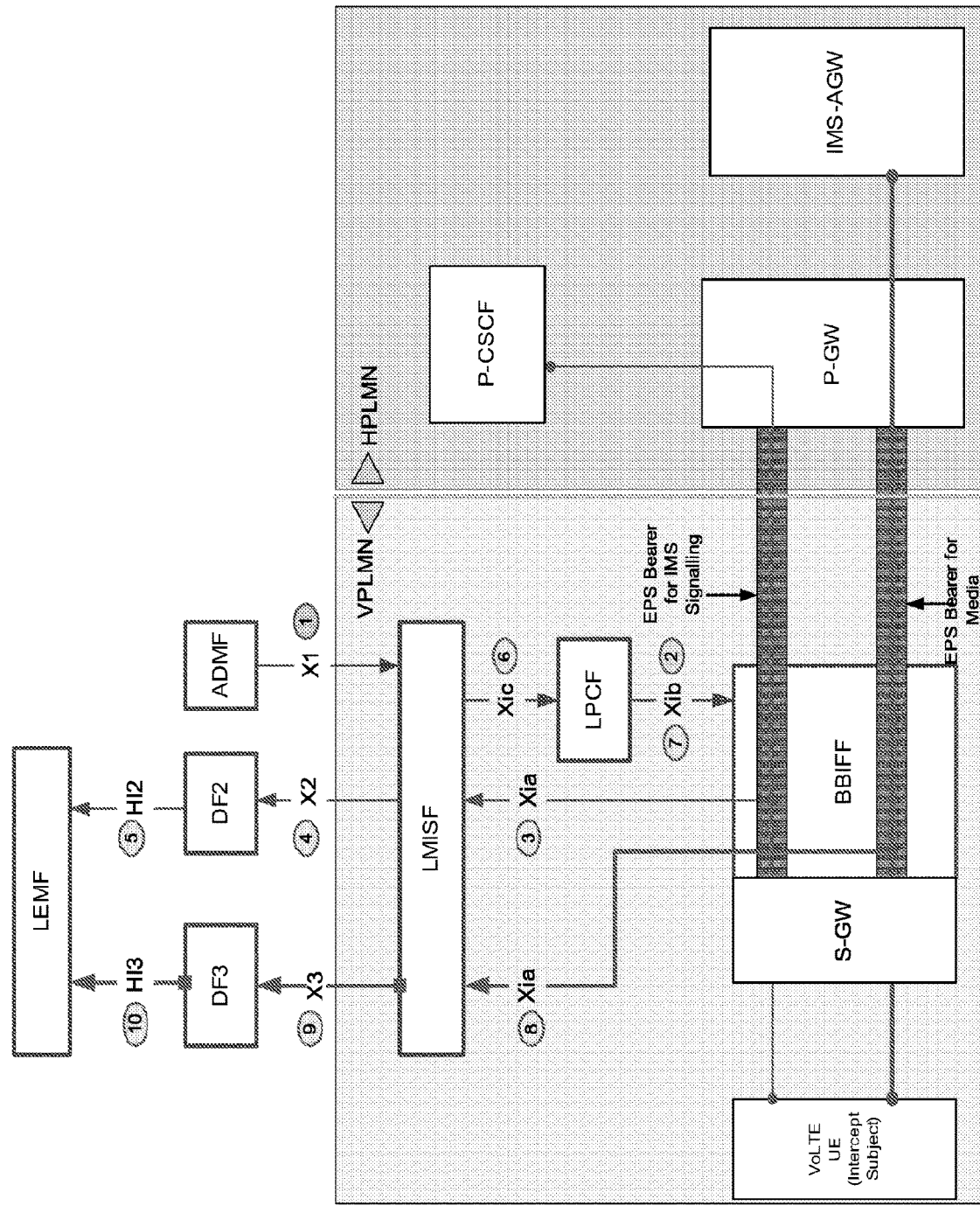
FIG. 11 illustrates a modified S8HR LI architecture, according to an embodiment.

Some embodiments may focus on the correlation aspects of an S8HR architecture. According to an embodiment, in step 4 of FIG. 9, the LMISF generates a Correlation Number and includes that correlation number while delivering the SIP messages to the DF2. In one embodiment, at step 7 of FIG. 9, the LPCF or any other network entity may instruct the BBIFF to deliver the Media packets associated with the IMS Signalling Bearer to the LMISF. LMISF will perform a deep packet inspection of Media packets to examine the IP address and the port number of the RTP stream so as to determine to which IMS session, the Media packets are related to. Once determined, the LMISF will deliver the Media packets to the DF3 along with the Correlation Number previously stored against the IMS session. FIG. 11 illustrates the modified S8HR LI architecture including process steps, according to some embodiments of the invention.

As illustrated in FIG. 11, at step 1, the LMISF is provisioned with Intercept Subject information (e.g., for Voice Services, it can be SIP URI, TEL URI or IMEI) from the ADMF. At step 2, LPCF or any other network entity instructs the BBIFF to deliver the packets of all IMS Signalling Bearers established for S8HR Access Point Names (APNs) to the LMISF. Here, the LPCF or any other network entity may supply the S8HR APNs to the BBIFF. In certain other embodiments, the LPCF and the interfaces connected to the LPCF may be removed, and at least part of the functions of the LPCF may be performed by one or more other network entities. At step 3, BBIFF delivers the packets of those IMS Signalling Bearers to the LMISF. As such, BBIFF has no idea whether the packets of an IMS Signalling Bearer are related to an Intercept Subject or not. BBIFF simply delivers all packets. At step 4, the LMISF performs a deep packet inspection and looks at the SIP messages and examines the SIP headers that carry the calling party identity and/or called party identity to verify whether any of those match with the Intercept Subject Identity stored locally. If the SIP message corresponds to an Intercept Subject, then LMISF delivers those packets to the DF2.

Figure 12:
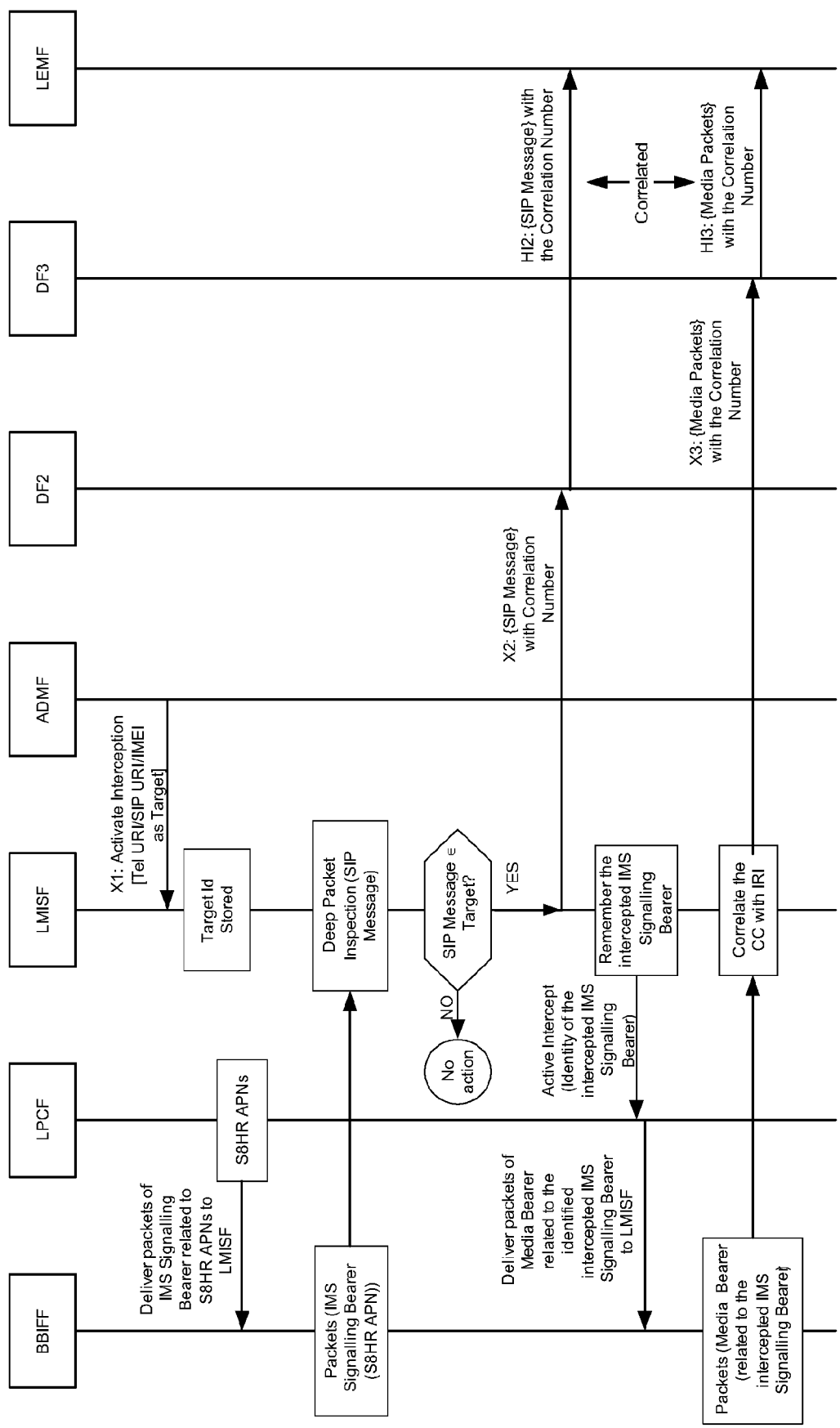
FIG. 12 illustrates a signaling flow diagram depicting a method, according to one embodiment.

Continuing with FIG. 11, at step 5, the DF2 will generate and deliver the IRI to the LEMF as per 3GPP TS 33.108. At step 6, the LMISF then informs the LPCF or any other network entity about the identity of the IMS Signalling Bearer that is being intercepted. At step 7, the LPCF or any other network entity instructs the BBIFF to deliver the packets of the Media Bearers linked to that IMS Signalling Bearer to LMISF. Then, at 8, BBIFF delivers the Media packets to the LMISF. BBIFF knows that the Media packets are related to an IMS Signalling Bearer, but does not know which Media packet related to which IMS session in the event Intercept Subject is involved in multiple sessions. In this embodiment, BBIFF need not know of the association between the Media packets and the IMS Signaling Bearer. At step 9, the LMISF performs a deep packet inspection of the Media packets that received at the LMISF, and examines the IP address and the port number associated with the RTP stream. Then, LMISF will determine the associated IMS session comparing the IP address/port number of the RTP stream with the similar information from the IMS session. LMISF delivers the Media packets to DF3 along with the Correlation Number it has used while delivering the SIP messages to DF2. At step 10, DF3 generates and delivers the CC as per 3GPP TS 33.108 to the LEMF. FIG. 12 illustrates the above process steps in a signaling flow diagram format, according to one embodiment. As discussed above regarding FIGS. 4, 7, and 9-11, in certain embodiments the LPCF and the interfaces connected thereto may be removed.

Figure 13:
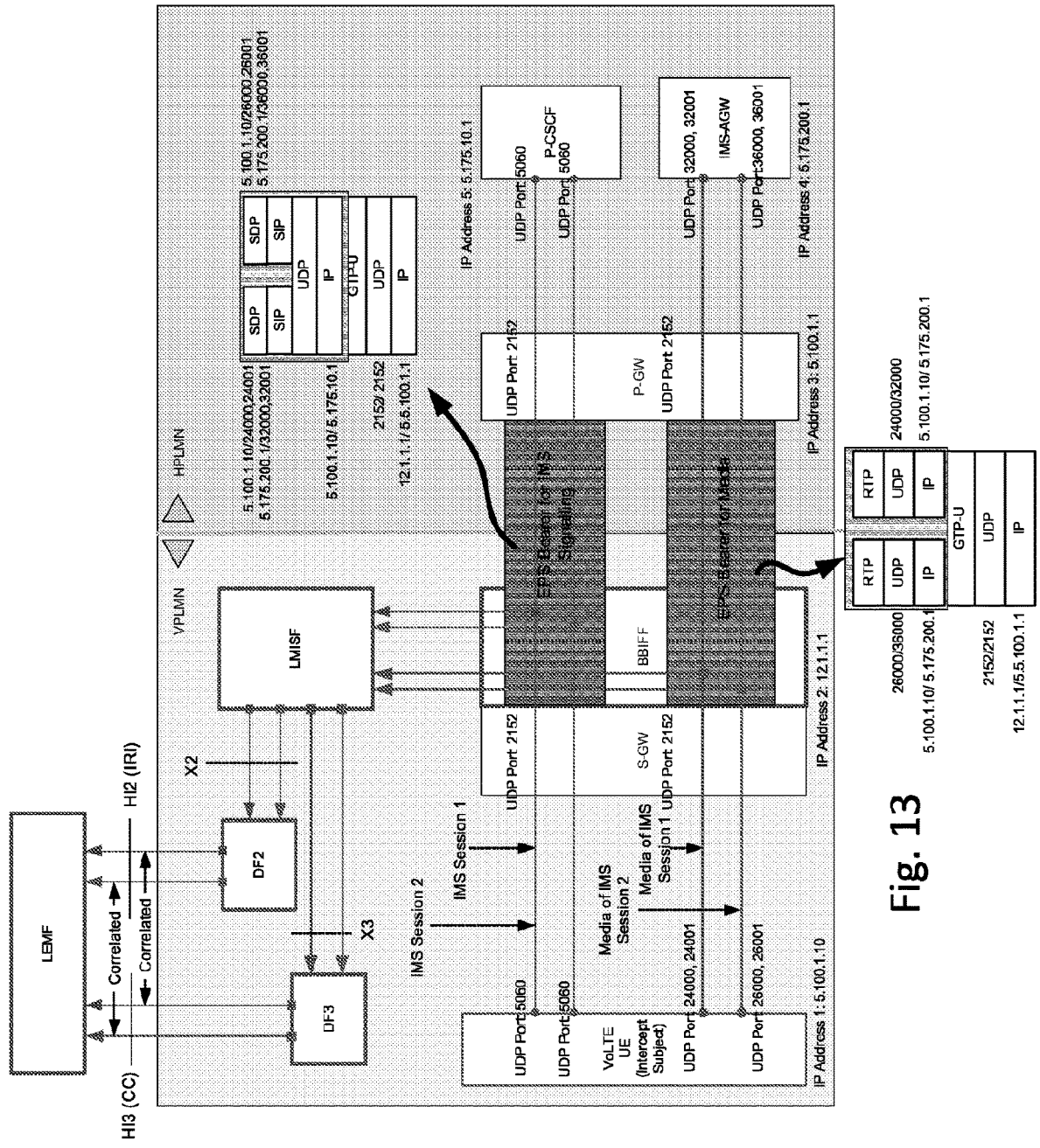
FIG. 13 illustrates examples of the protocol stacks associated with the IMS Signalling Bearer and the Media Bearer, according to an embodiment.

FIG. 13 illustrates an embodiment of the invention using some examples to the protocol stacks associated with the IMS Signalling Bearer and the Media Bearer. Using some real numbers for IP addresses and port numbers, FIG. 13 depicts the flow of IMS Signalling packets in the IMS Signalling Bearer and Media packets in the Media Bearer. In the example of FIG. 13, the Intercept Subject is involved in two IMS sessions. In the embodiment shown in FIG. 13, the LPCF is absent.

The example shown in FIG. 13 uses some real numbers for IP addresses and the port numbers as shown below:
  VoLTE UE IP address (assigned by the P-GW): 5.10.1.10
  S-GW IP address towards the P-GW (GTP-U tunnel end point): 12.1.1.1
  P-GW IP address towards the S-GW (GTP-U tunnel end point) 5.100.1.1
  IMS-AGW IP address towards the P-GW: 5.175.200.1
  P-CSCF IP address: 5.175.10.1
  Port number used for SIP signalling: 5060
  Port number used for GTP-U tunnel: 2152
  UE port numbers used for RTP streams for IMS session 1: 24000, 24001
  IMS-AGW port numbers used for RTP streams for IMS session 1: 32000, 32001
  UE port numbers used for RTP streams for IMS session 1: 26000, 26001
  IMS-AGW port numbers used for RTP streams for IMS session 1: 36000, 36001.

The two GTP-U tunnels (used for IMS Signalling Bearer and Media Bearer) use the same IP address and port numbers but have two different tunnel identifiers (not shown in FIG. 13). For the S-GW, the information above the GTP layer is just a pay-load. No processing is done on that information within the S-GW.

When BBIFF is asked to deliver the packets from the IMS Signalling Bearers to LMISF, it delivers everything above the GTP-U layer. BBIFF does not look into the IMS packets above the GTP-U layer. Similarly, when the BBIFF is asked to deliver the packets from the Media Bearer to the LMISF, it delivers everything above the GTP-U layer. It does not look into the Media packets above the GTP-U layer. However, the BBIFF knows that the Media Bearer and the IMS Signalling Bearer are related through the GTP protocol concepts defined in 3GPP TS 29.274.

Figure 14:
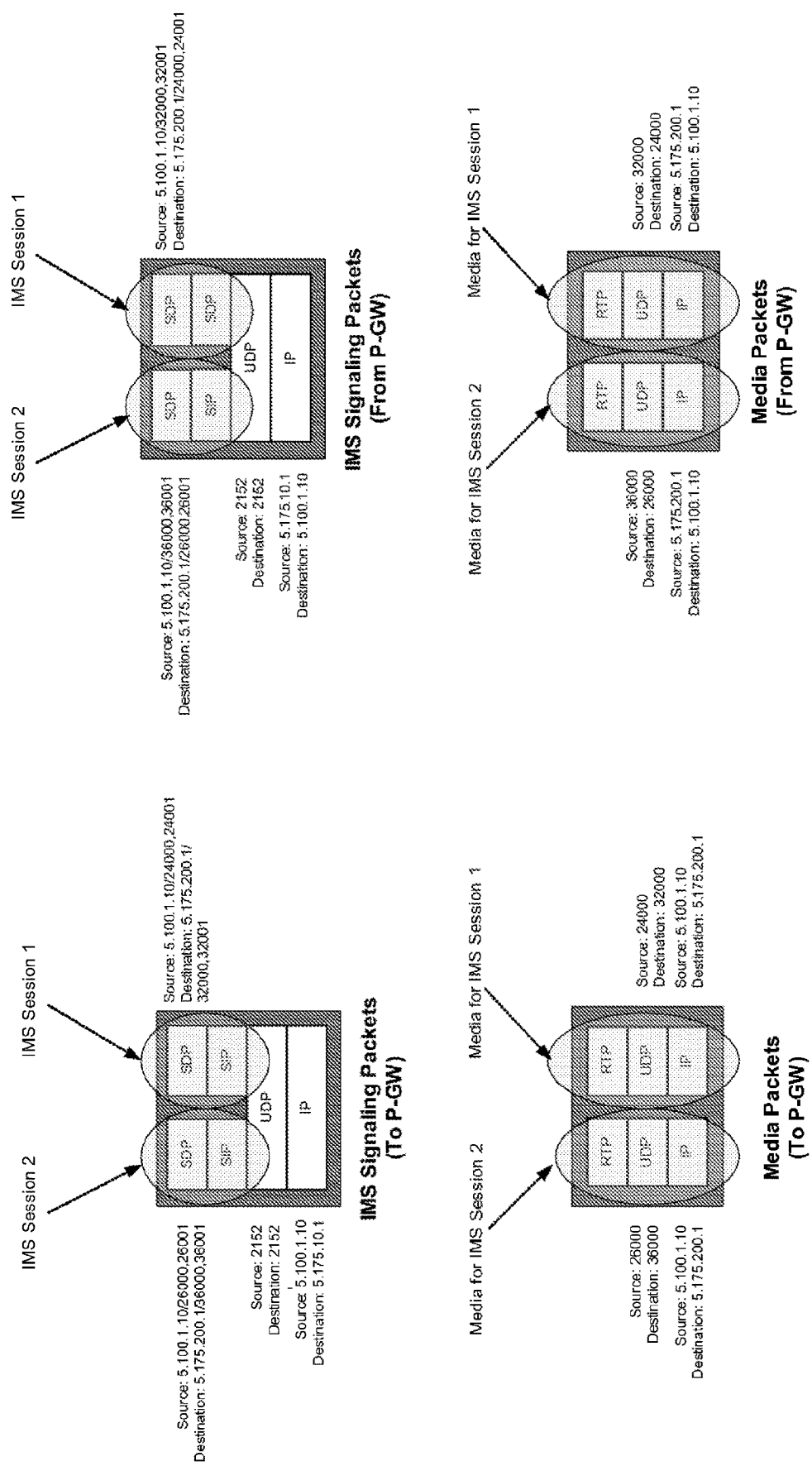
FIG. 14 illustrates an example protocol stack related to the Packets delivered to LMISF, according to an embodiment.

LMISF receives the IMS Signalling packets and Media packets from the BBIFF and FIG. 14 illustrates what LMISF sees from a protocol stack point of view. As illustrated in FIG. 14, the IP address and UDP port number used to carry the RTP streams match the IP address and UDP port numbers exchanged using the SIP messages. For example, for IMS session 1, the VoLTE UE includes 5.100.1.10 as the own IP address with 24000 real time protocol (RTP), 24001 real time control protocol (RTCP) as the own user datagram protocol (UDP) port numbers and receives 5.175.200.1 as the far end IP address with 32000 (RTP), 32001 (RTCP) as the UDP port numbers.

Once it is determined that a SIP message involves an Intercept Subject, the LMISF may allocate a Correlation Number and store it locally against that IMS session. When the Media packets are received, the LMISF may examine IP address and UDP port numbers used to carry the RTP streams to determine the associated IMS session. Once a match is made, the LMISF may use the Correlation Number that it had used while delivering the SIP messages to the DF2 as the Correlation Number delivered to the DF3.

Figure 15:
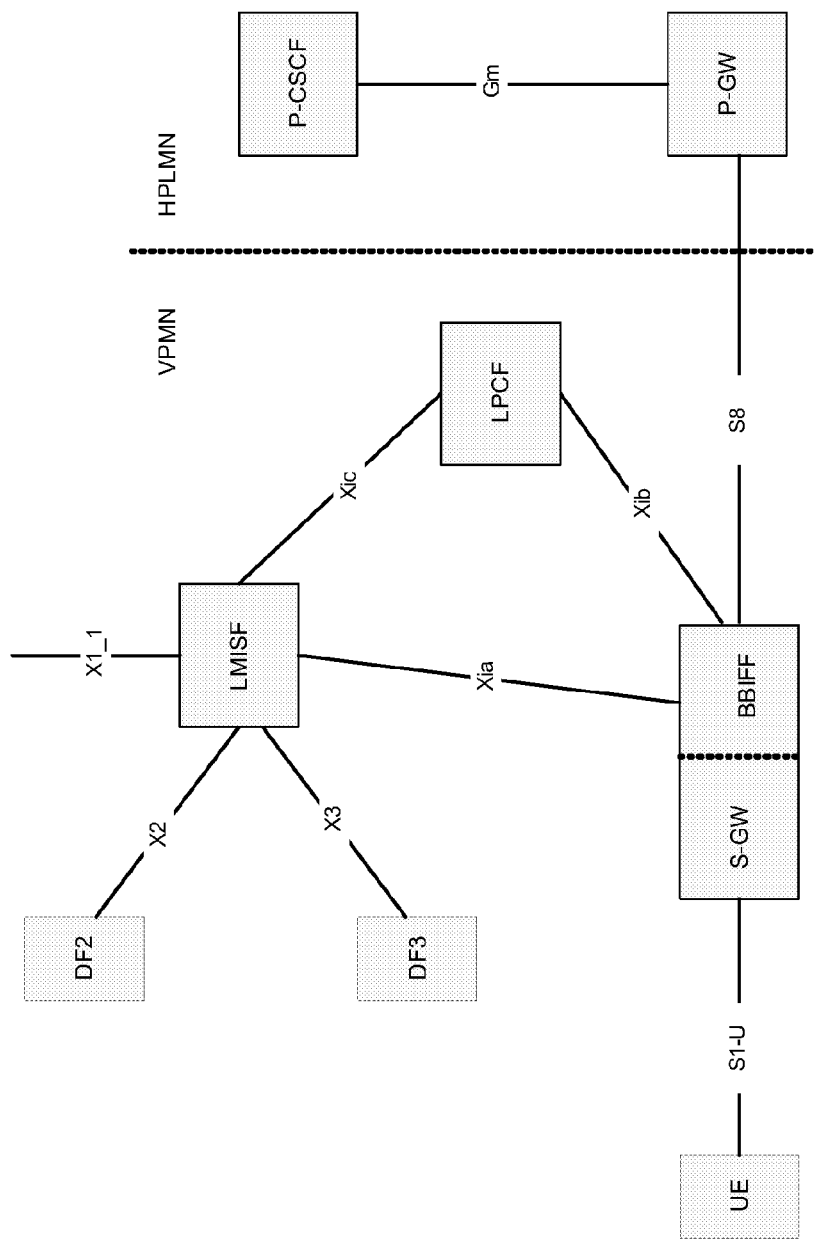
FIG. 15 illustrates a block diagram of a modified S8HR LI architecture, according to an embodiment.

FIG. 15 illustrates a block diagram of a modified S8HR LI architecture, according to an embodiment of the invention. The provisioning interface is shown in FIG. 15 as X1_1 (instead of X1 as shown in FIG. 4) because since X1_1 is the correct name to the reference point from ADMF to the network node that provides the interception (see FIG. 2). In addition to solving the problem of correlation, the modified architecture of FIG. 15 also provides additional advantages. In the embodiment of FIG. 15, BBIFF delivers the packets from both IMS Signalling Bearer and Media Bearer to the same destination (i.e., LMISF), as compared to the current architecture where the packets from the IMS Signalling Bearer are delivered to LMISF and packets from the Media Bearer are delivered to DF3. Delivering to one destination instead of two can be viewed as an improvement.

In the United States, the LI standards require the delivery of an IRI message referred to as CCOpen when the CC delivery begins. With the modified architecture of FIG. 15, the delivery of CCOpen becomes very simple because LMISF knows exactly when the CC delivery begins.

In a further embodiment, whenever the LMISF determines that an IMS session involves an Intercept Subject, it may pass on a token to BBIFF and BBIFF may include this token whenever the Media packets are delivered to the LMISF. In some embodiments, a token may be passed from the LMISF to the BBIFF either directly or indirectly through any other network entity. In embodiments that include the LPCF, the token may be passed through the LPCF. In certain other embodiments that do not include the LPCF, the token may be passed directly to the BBIFF or indirectly to the BBIFF through any other network entity. The use of such a token may improve the LMISF implementation in determining the association of Media packets to the IMS session. However, it should be noted that certain embodiments do not necessarily need to use the token.

As mentioned above, in an embodiment, the implementation of BBIFF may be improved since the BBIFF delivers the packets (of IMS Signalling Bearer and Media Bearer) to only one destination point (i.e., LMISF). According to an embodiment, the LMISF has X2 and X3 interfaces to DF2 and DF3, respectively. It can be ensured that LMISF (being a new functional entity) takes the burden of ensuring the information delivered over X2 and X3 are in the same format as that used for other VoIP scenarios (non-roaming, LBO case). This may ensure that the DF2 and DF3 used for other VoIP call scenarios can be used with S8HR as well. In the current approaches, BBIFF has the X3 interface to DF3 and with BBIFF simply delivering the Media packets to DF3, it will be a burden of DF3 to receive the Media packets in the format that BBIFF delivers. This will impact the DF3.

Unlike the 3GPP standards, the United States LI regulations require to map the SIP messages to call state events such as "Origination", "TerminationAttempt", "Answer", "Release", etc. While in most of the LI implementations, the DF2 provides the required mapping, there are certain IRI events that are closely coupled with the CC. A few examples include: the sending of CCOpen when the CC delivery begins, the sending of CCClose when the CC delivery ends, collecting the post-cut through DTMF digits from the content of Intercept Subject, and reporting those digits using the message DialedDigitExtraction. With Media packets available, the LMISF will be able to generate those events rather easily.

Figure 16:
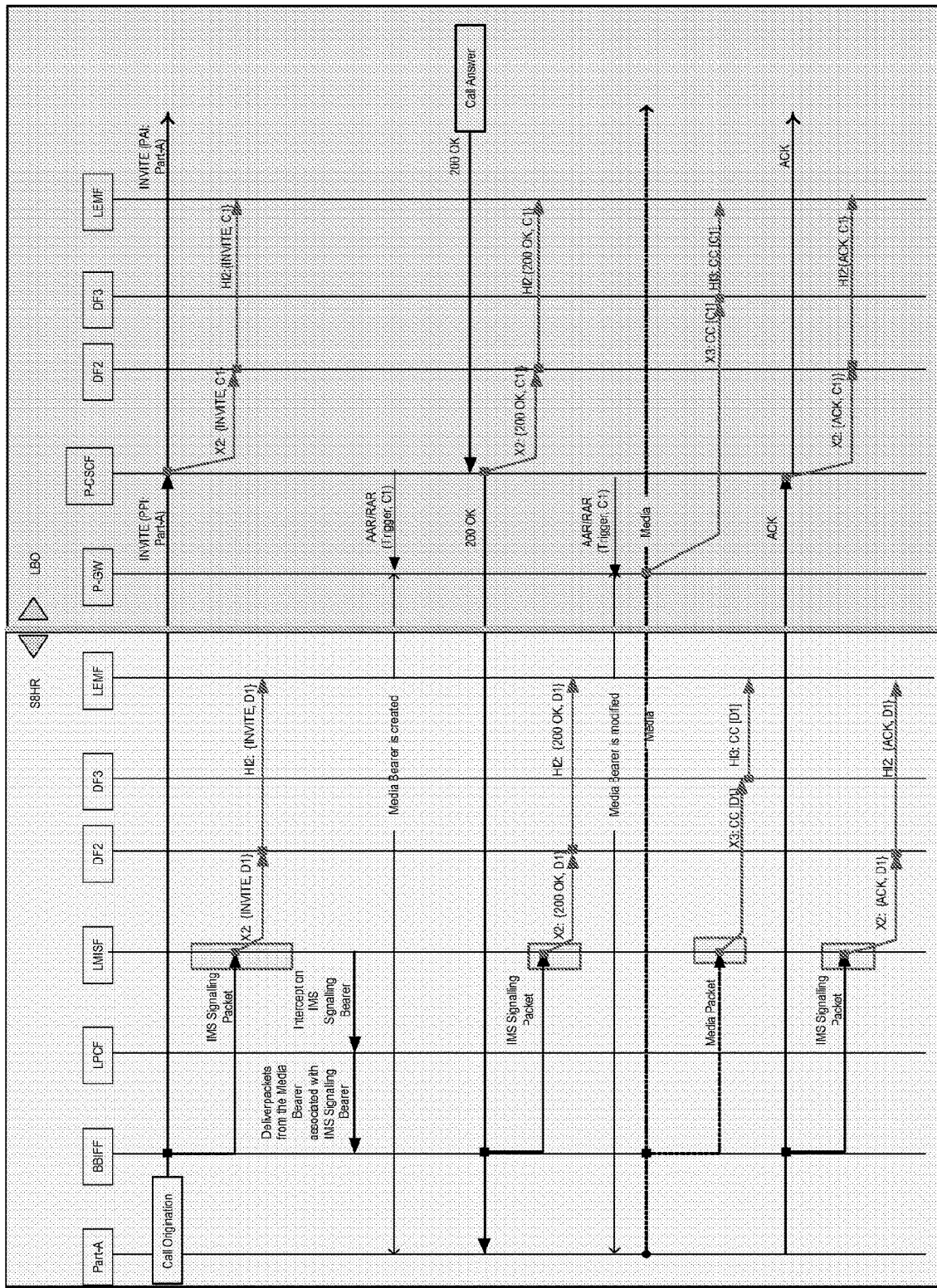
FIG. 16 illustrates a call flow diagram depicting LI functions in the VPLMN, according to an embodiment.

FIG. 16 illustrates a call flow diagram depicting LI functions in the VPLMN, according to an embodiment. FIG. 16 is a two-in-one call flow in the sense that the call flow covers both types of VoLTE roaming architectures, where the left half of the diagram is for S8HR based approach and the right half for LBO based approach. When FIG. 16 is applied for S8HR LI (left part of the figure), the LMISF, after inspecting and determining that the IMS Signalling packets involve an Intercept Subject, delivers IRI messages via DF2 to the LEMF with the Correlation Number Dl. When the Media packets are received from the BBIFF, the LMISF delivers the CC via DF3 to the LEMF with the same Correlation Number Dl.

When FIG. 16 is applied for LBO LI (right part of the figure), the P-CSCF, after inspecting and determining that the IMS session involves an Intercept Subject, delivers IRI messages via DF2 to the LEMF with the Correlation Number C1. The P-CSCF sends the CC Intercept Trigger that contains the Correlation Number C1 to the P-GW during the call establishment. The P-GW delivers the CC via DF3 to the LEMF using the Correlation Number C1.

Figure 17:
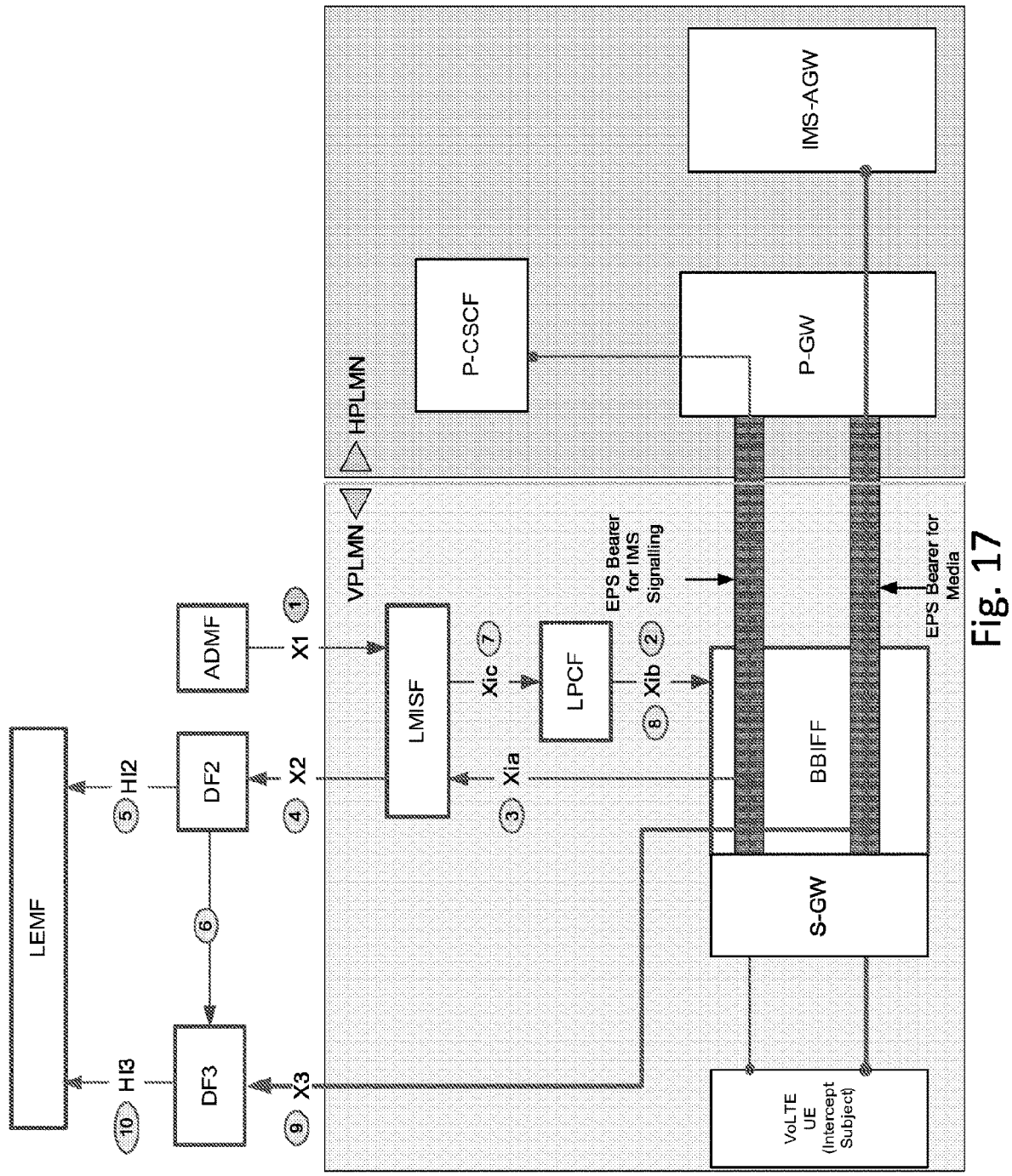
FIG. 17 illustrates a block diagram depicting a modified S8HR LI Architecture with an alternative DF2 to DF3 Communication, according to another embodiment.

FIG. 17 illustrates a block diagram depicting a modified S8HR LI Architecture with an alternative DF2 to DF3 Communication, according to another embodiment. In this embodiment, when the DF2 receives the IRI messages from the LMISF, it may send the Correlation Number along with the Media Identifier to the DF3. The DF3, upon receiving the Media packets, may use the Correlation Number to deliver the CC to the LEMF.

As illustrated in FIG. 17, at step 1, the LMISF is provisioned with Intercept Subject information (e.g., for Voice Services, it can be SIP URI, TEL URI or IMEI) from the ADMF. At step 2, the LPCF instructs the BBIFF to deliver the packets of all IMS Signalling Bearers established for S8HR APNs to the LMISF. Here, the LPCF may supply the S8HR APNs to the BBIFF. In certain other embodiments, no LPCF is included, and at least part of the functioning of the LPCF may be performed by any other network entity, including at least LMISF. At step 3, the BBIFF delivers the packets of those IMS Signalling Bearers to the LMISF. As such, the BBIFF has no idea whether the packets of an IMS Signalling Bearer are related to an Intercept Subject or not. The BBIFF simply delivers all packets.

Continuing with FIG. 17, at step 4, the LMISF performs a deep packet inspection and looks at the SIP messages and examines the SIP headers that carry the calling party identity and/or called party identity to verify whether any of those match with the Intercept Subject Identity stored locally. If the SIP message corresponds to an Intercept Subject, then the LMISF delivers those packets to the DF2. At step 5, the DF2 may generate and deliver the IRI to the LEMF as per TS 33.108. At step 6, the DF2 may send the Media Identifier and Correlation Number of the intercepted IMS session to DF3. The LMISF then informs the LPCF, at step 7, about the identity of the IMS Signalling Bearer that is being intercepted. At step 8, the LPCF instructs the BBIFF to deliver the packets of the Media Bearers linked to that IMS Signalling Bearer to DF3 (as in the architecture defined in 3GPP TR 33.827). As discussed above, in certain embodiments no LPCF is included, and at least part of the functioning of the LPCF may be performed by any other network entity, including the LMISF.

Figure 18:
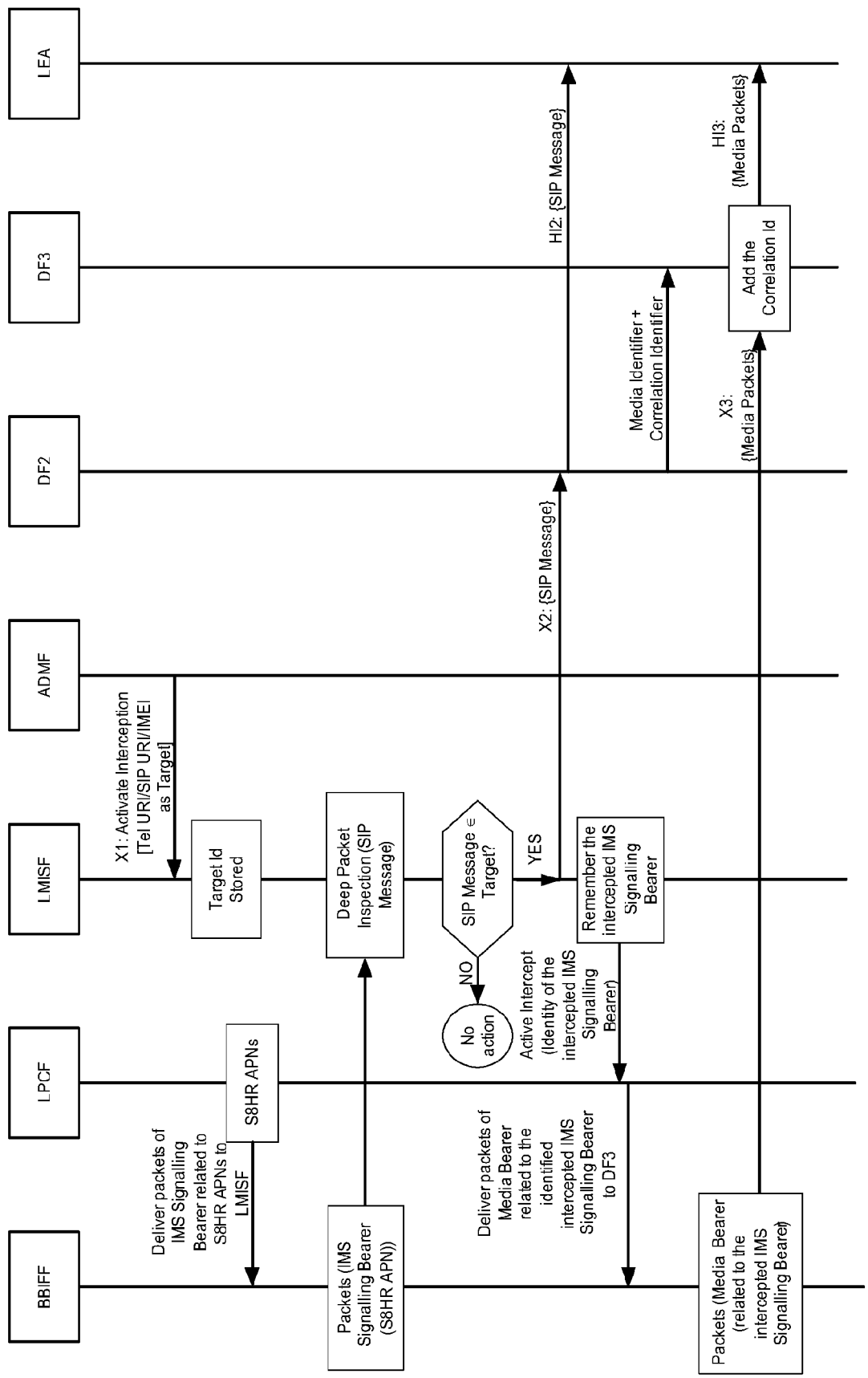
FIG. 18 illustrates a flow diagram depicting a process of an alternative of DF2 to DF3 communication, according to an embodiment.

At step 9, the BBIFF delivers the Media packets to the DF3. The BBIFF knows that the Media packets are related to an IMS Signalling Bearer, but does not know which Media packet is related to which IMS session in the event Intercept Subject is involved in multiple sessions. In this approach, BBIFF need not know that association. At step 10, the DF3 performs a deep packet inspection of the Media packets that it receives and examines the IP address and the port number associated with the RTP stream. Then, DF3 compares it with the Media Identifier supplied earlier by the DF2. When a match is found, the DF3 would deliver the CC to the LEMF using the Correlation Number that it has received from the DF2. FIG. 18 illustrates a flow diagram depicting the process steps of an alternative of DF2 to DF3 Communication, according to the embodiment described above. Although a LPCF is included in FIG. 18, in certain embodiments no LPCF is included, and at least part of the functioning of the LPCF may be performed by any other network entity, including at least LMISF.

According to yet another embodiment, the embodiment described in FIG. 9 may be modified such that deep packet inspection is performed at the BBIFF. In this embodiment, changes may be made to steps 6, 7 and 8 of FIG. 9. For example, at step 7, the LMISF informs the LPCF or any other network entity about the identity of the IMS Signalling Bearer that is being intercepted. LMISF also supplies the Media Identifier (IP address and the port number) and the Correlation Number. At step 8, the LPCF or any other network entity may instruct the BBIFF to deliver the packets of the Media Bearers linked to that IMS Signalling Bearer to DF3. LPCF or any other network entity may also pass the Media Identifier and Correlation Number information to the BBIFF. Then, at step 8, the BBIFF performs a deep packet inspection of Media packets to determine the IP address and the port numbers of the RTP streams. When a match is found, the BBIFF delivers the Media packets to the DF3 along with the Correlation Number.

In a further embodiment, correlation may be performed within the LEMF. In this embodiment, no correlation is done by the VPLMN. Instead, if the entire Media packets (including the IP address and the port numbers) are sent to the LEMF, the LEMF may perform a deep packet inspection and correlate the IRI with the CC.

Figure 19:
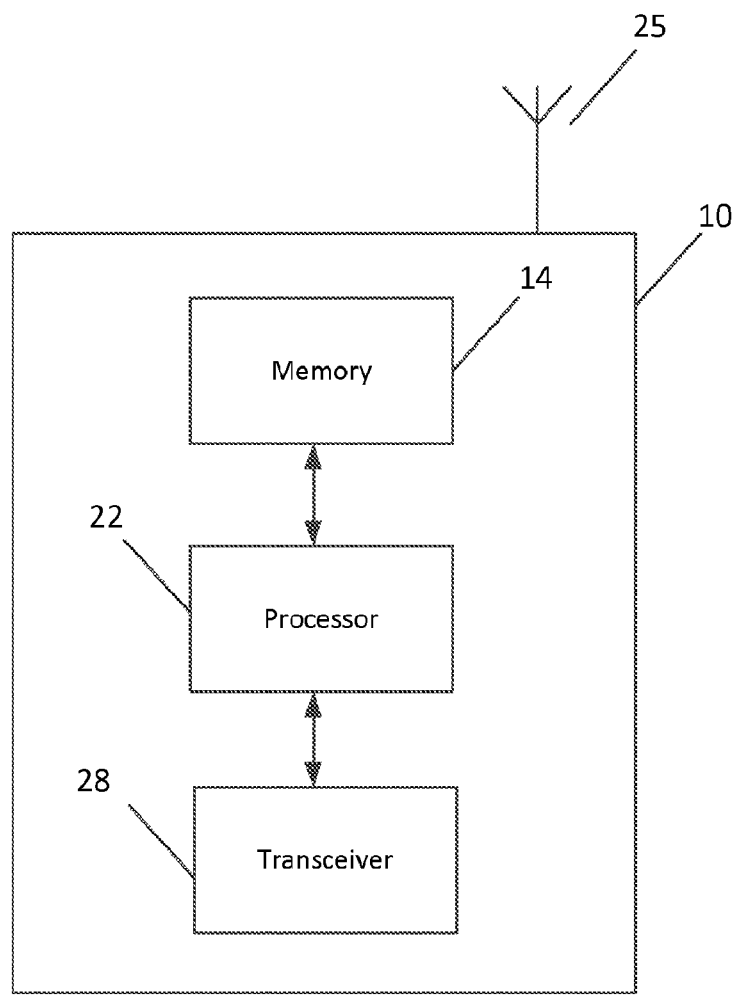
FIG. 19 illustrates a block diagram of an apparatus, according to one embodiment.

FIG. 19 illustrates an example of an apparatus 10 according to an embodiment. In certain embodiments, apparatus 10 may be a node, host, or server in a communications network or serving such a network. For example, apparatus 10 may be a network node in a radio access network, such as a BBIFF, LPCF, LMISF, ADMF, DF2, DF3, and/or LEMF. It should be noted that one of ordinary skill in the art would understand that apparatus 10 may include components or features not shown in FIG. 19.

As illustrated in FIG. 19, apparatus 10 may include or be coupled to a processor 22 for processing information and executing instructions or operations. Processor 22 may be any type of general or specific purpose processor. While a single processor 22 is shown in FIG. 19, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 22, for storing information and instructions that may be executed by processor 22. Memory 14 may be one or more memories and of any type suitable to the local application environment. For instance, memory 14 may be implemented using any suitable volatile or nonvolatile data storage technology, such as a semiconductor-based memory device, a magnetic memory device or system, an optical memory device or system, fixed memory, or removable memory. As an example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of LTE, WLAN, Bluetooth, BT-LE, NFC, radio frequency identifier (RFID), ultra-wideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In some embodiments, an apparatus, such as a user equipment or a network node, may include means for carrying out embodiments described above in relation to FIGS. 1-18. In certain embodiments, at least one memory including computer program code can be configured to, with the at least one processor, cause the apparatus at least to perform any of the processes described herein.

In one embodiment, apparatus 10 may be a network entity, a network node, or a network access node, such as a BBIFF, LMISF, ADMF, DF2, DF3, and/or LEMF, for example, or any other network entity. According to one embodiment, apparatus 10 may be controlled by memory 14 and processor 22 to perform the functions associated with embodiments described herein. For instance, in an embodiment, apparatus 10 may be a LMISF as shown in FIGS. 9-13 and 15-18. In certain embodiments, apparatus 10 may be controlled by memory 14 and processor 22 to receive intercept subject information/identity from an ADMF or other network node. For example, for Voice Services, the intercept subject information may be SIP URI, TEL URI or IMEI. According to an embodiment, a LPCF or any other network entity, including the LMISF, may instruct a BBIFF to deliver the packets of all IMS Signalling Bearers established for S8HR APNs to apparatus 10. In an embodiment, the LPCF or any other network entity may supply the S8HR APNs to the BBIFF, and apparatus 10 may be further controlled by memory 14 and processor 22 to receive the packets of the IMS Signalling Bearers established for S8HR from the BBIFF. The BBIFF may not know whether the packets of an IMS Signalling Bearer are related to an Intercept Subject or not, but just sends all of the packets to apparatus 10.

In an embodiment, apparatus 10 may then be controlled by memory 14 and processor 22 to perform a deep packet inspection to look at the packets (e.g., SIP messages) and examine the headers (e.g., SIP headers) that carry the calling party identity and/or called party identity to verify whether any of those match with the intercept subject information/ identity previously received and stored locally by apparatus 10. If a packet (or SIP message) corresponds to an Intercept Subject, then apparatus 10 may be controlled by memory 14 and processor 22 to deliver those packets to the DF2, along with a correlation number generated by apparatus 10. The DF2 may generate and deliver the IRI to the LEMF. According to an embodiment, apparatus 10 may be controlled by memory 14 and processor 22 to inform the LPCF or any other network entity about the identity of the IMS Signalling Bearer that is being intercepted. In turn, the LPCF or any other network entity may instruct the BBIFF to deliver the packets of the Media Bearers linked to that IMS Signalling Bearer to apparatus 10.

Accordingly, in one embodiment, apparatus 10 may be controlled by memory 14 and processor 22 to receive the Media packets from the BBIFF. In an embodiment, the BBIFF may know that the Media packets are related to an IMS Signalling Bearer, but does not know which Media packet is related to which IMS session in the event Intercept Subject is involved in multiple sessions. In certain embodiments, apparatus 10 may then be controlled by memory 14 and processor 22 to perform a deep packet inspection of the Media packets that it receives and examines the IP address and the port number associated with the RTP stream. Then, apparatus 10 may then be controlled by memory 14 and processor 22 to determine the associated IMS session comparing the IP address/port number of the RTP stream with the similar information from the IMS session. In one embodiment, apparatus 10 may be further controlled by memory 14 and processor 22 to deliver the Media packets to DF3 along with the Correlation Number it has used while delivering the packets (e.g., SIP messages) to DF2. DF3 may then generate and deliver the CC to the LEMF.

Another embodiment may be directed to a method for correlating intercept related information (IRI) with call content (CC) for S8HR lawful interception. In certain embodiments, the method may be performed by a LMISF. In one embodiment, the method may include receiving intercept subject information/identity from an ADMF or other network node. For example, for Voice Services, the intercept subject information/identity may be SIP URI, TEL URI or IMEI. According to an embodiment, a LPCF or any other network entity may instruct a BBIFF to deliver the packets of all IMS Signalling Bearers established for S8HR APNs to the LMISF. In an embodiment, the LPCF or any other network entity may supply the S8HR APNs to the BBIFF, and the method may further include receiving the packets of the IMS Signalling Bearers established for S8HR from the BBIFF. The BBIFF may not know whether the packets of an IMS Signalling Bearer are related to an Intercept Subject or not, but just sends all of the packets to LMISF.

In an embodiment, the method may also include performing a deep packet inspection to look at the packets (e.g., SIP messages) and examining the headers (e.g., SIP headers) that carry the calling party identity and/or called party identity to verify whether any of those match with the intercept subject information/identity previously received and stored locally by LMISF. If a packet (or SIP message) corresponds to an Intercept Subject, then the method may include delivering those packets to the DF2, along with a correlation number generated by the LMISF. The DF2 may generate and deliver the IRI to the LEMF. According to an embodiment, the method may then include informing the LPCF or any other network entity about the identity of the IMS Signalling Bearer that is being intercepted. In turn, the LPCF or any other network entity may instruct the BBIFF to deliver the packets of the Media Bearers linked to that IMS Signalling Bearer to the LMISF.

Accordingly, in one embodiment, the method may also include receiving the Media packets from the BBIFF. In an embodiment, the BBIFF may know that the Media packets are related to an IMS Signalling Bearer, but does not know which Media packet is related to which IMS session in the event Intercept Subject is involved in multiple sessions. In certain embodiments, the method may include performing a deep packet inspection of the Media packets that it receives and examines the IP address and the port number associated with the RTP stream. Then, the LMISF may determine the associated IMS session comparing the IP address/port number of the RTP stream with the similar information from the IMS session. In one embodiment, the method may include delivering the Media packets to DF3 along with the Correlation Number it has used while delivering the packets (e.g., SIP messages) to DF2. DF3 may then generate and deliver the CC to the LEMF.

In some embodiments, the functionality of any of the methods, processes, signaling diagrams, or flow charts described herein may be implemented by software and/or computer program code or portions of code stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary

3GPP 3rd Generation Partnership Project
ADMF Administration Function
AGW Access Gateway
ASN.1 Abstract Syntax Notation One
ATIS Alliance for Telecommunications Industry Solutions
BBIFF Bearer Binding Intercept and Forwarding Function
BCF Border Control Function
CALEA Communications Assistance for Law Enforcement Act
CC Call Content (or Communication Content)
CII Call Identifying Information (aka IRI)
CS Circuit Switched
CSCF Call State Control Function
CSP Communication Service Provider
DF Delivery Function
DF2 Delivery Function 2 (for IRI)
DF3 Delivery Function 3 (for CC)
DTMF Dual Tone Multi Frequency
EPC Evolved Packet Core
EPS Evolved Packet System
ETSI European Telecommunications Standards Institute
GGSN Gateway GPRS Support Node
GPRS Generic Packet Radio Service
GSM Global Systems Mobile
GSMA GSM Association
GSN GPRS Support Nodes
GTP GPRS Tunnelling Protocol
HI1 Handover Interface 1 (for admin)
HI2 Handover Interface 2 (for IRI)
HI3 Handover Interface 3 (for CC)
HPLMN Home PLMN
IBCF Interworking BCF
I-CSCF Interrogating CSCF
IAP Internet Access Point
ICE Intercepting Control Element
ID Identity or Identifier
IMEI International Mobile Equipment Identity
IMSI International Mobile Subscriber Identity
IM-MGW IMS Media Gateway
IMS IP Multimedia System
IMS-AGW IMS Access Gateway
IP Internet Protocol
IP-CAN IP Carrier Access Network
IRI Intercept Related Information
LBO Local Breakout
LEA Law Enforcement Agency
LEMF Law Enforcement Monitoring Facility
LI Lawful Interception
LMISF LI Mirror IMS State Function
LPCF LI Policy Control Function
LTE Long Term Evolution
MF Mediation Function
MGCF Media Gateway Control Function
MGWMedia Gateway
MME Mobility Management Entity
MRF Media Resource Function
MSISDN Mobile Station Integrated Services Digital Number
P-CSCF Proxy CSCF
PCRF Policy and Charging Rules Function
PDN Packet Data Network
P-GWPDN-Gateway
PDN-GW PDN-Gateway
PDP Packet Data Protocol
PLMN Public Land Mobile Network
RTCP Real Time Control Protocol
RTP Real Time Protocol
S-CSCF Serving CSCF
TrGW Transit Gateway
S8HR S8 based Home Routing
S-GWServing Gateway
SIP Session Initiation Protocol
SA3 Services and Systems Aspects TSG 3
SDP Session Description Protocol
SIP Session Initiation Protocol
SIP URI SIP URI (URI in SIP format)
TEL Telephone
TEL URI Telephone URI (URI in telephone number format)
UDP User Datagram Protocol
URI Uniform Resource Identifier
VoIP Voice over IP
VoLTE Voice over LTE
VPLMN Visited PLMN
X1 Interface (for admin between ADMF and access function)
X2 Interface (for IRI between access function and DF2)

We claim:

1. A method comprising:
generating at a network entity a correlation identifier, wherein the correlation identifier comprises an S8 home routing access point name;
adding the correlation identifier to a session initiation protocol message at the network entity; and
delivering the session initiation protocol message including the correlation identifier from the network entity to another network entity, wherein the method is associated with correlating media packets flowing through an evolved packet system bearer for media of an internet protocol multimedia subsystem to corresponding session initiation protocol sessions where the session initiation protocol sessions' packets are flowing through an internet protocol multimedia system signaling bearer.

2. The method according to claim 1, further comprising:
receiving the media packets from the another network entity associated with the internet protocol multimedia subsystem signaling bearer established using the correlation identifier, and wherein the media packets are related to intercept related information.

3. The method according to claim 2, wherein the bearer is established using an S8 home routing access point name.

4. The method according to claim 2, further comprising:
correlating at the network entity the received intercept related information and the correlation identifier for lawful interception.

5. The method according to claim 1, further comprising:
performing at the network entity a deep packet inspection of the media packets to verify whether information included in the media packets matches previously received or stored intercept related information.

6. The method according to claim 5, wherein the inspection of the media packets includes inspecting a header comprising at least one of an internet protocol address or a port number of a real time protocol stream.

7. The method according to claim 5, further comprising:
determining based on the deep packet inspection an internet protocol multimedia subsystem session to which the media packets are related.

8. The method according to claim 5, wherein the previously stored intercept related information is received from an administration function.

9. The method according to claim 8, wherein the intercept related information includes at least one of a session initiation protocol uniform resource identifier, a telephone uniform resource identifier, and international mobile equipment identity.

10. The method according to claim 1, further comprising:
transmitting from the network entity at least one of the media packets or the correlation identity to a law enforcement monitoring function.

11. The method according to claim 10, wherein the transmitting of the at least one of the media packets or the correlation identity to the law enforcement monitoring function occurs through a DF3 interface.

12. The method according to claim 1, wherein the network entity is a lawful interception mirror internet protocol multimedia system state function.

13. The method according to claim 1, wherein the another network entity is a bearer binding intercept and forwarding function.

14. A method comprising:
receiving at a network entity a session initiation protocol message including a correlation identifier from another network entity, wherein the correlation identifier comprises an S8 home routing access point name; and
transmitting media packets associated with an internet protocol multimedia subsystem signaling bearer established using the correlation identifier from the network entity to the another network entity, wherein the media packets are related to intercept related information, wherein the method is associated with correlating the media packets flowing through an evolved packet system bearer for media of an internet protocol multimedia subsystem to corresponding session initiation protocol sessions where the session initiation protocol sessions' packets are flowing through the internet protocol multimedia system signaling bearer.

15. The method according to claim 14, further comprising:
determining at the network entity whether or not the media packets of the internet protocol multimedia subsystem signaling bearer are related to the intercept related information.

16. The method according to claim 14, wherein the network entity is a bearer binding intercept and forwarding function.

17. The method according to claim 14, wherein the another network entity is a lawful interception mirror internet protocol multimedia system state function.

18. The method according to claim 14, wherein the intercept related information includes at least one of a session initiation protocol uniform resource identifier, a telephone uniform resource identifier, and an international mobile equipment identity.

19. An apparatus comprising:
at least one processor; and
at least one memory including computer program code,
wherein the at least one memory and the computer program code are configured to, with the at least one processor, cause the apparatus at least to perform a process according to claim 1.

20. A computer program product embodied on a non-transitory computer-readable medium encoding instructions that, when executed in hardware, perform a process according to claim 1.

* * * * *